United States Patent
Abbas et al.

(10) Patent No.: US 10,652,558 B2
(45) Date of Patent: *May 12, 2020

(54) APPARATUS AND METHODS FOR VIDEO COMPRESSION USING MULTI-RESOLUTION SCALABLE CODING

(71) Applicant: GoPro, Inc., San Mateo, CA (US)

(72) Inventors: Adeel Abbas, Carlsbad, CA (US); Balineedu Chowdary Adsumilli, San Francisco, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,214

(22) Filed: Dec. 27, 2018

(65) Prior Publication Data

US 2019/0246126 A1     Aug. 8, 2019

Related U.S. Application Data

(60) Continuation of application No. 15/799,837, filed on Oct. 31, 2017, now Pat. No. 10,212,438, which is a
(Continued)

(51) Int. Cl.
*H04N 19/30* (2014.01)
*H04N 19/187* (2014.01)
(Continued)

(52) U.S. Cl.
CPC ........... *H04N 19/30* (2014.11); *H04N 19/146* (2014.11); *H04N 19/167* (2014.11);
(Continued)

(58) Field of Classification Search
USPC .................................................. 375/240.02
See application file for complete search history.

(56) References Cited

U.S. PATENT DOCUMENTS

| 5,649,032 A | 7/1997 | Burt |
|---|---|---|
| 6,389,179 B1 | 5/2002 | Katayama |

(Continued)

FOREIGN PATENT DOCUMENTS

| EP | 1162830 A2 | 12/2001 |
|---|---|---|
| WO | 2013130071 A1 | 9/2013 |

(Continued)

OTHER PUBLICATIONS

Grois, et al., "Efficient Adaptive Bit-Rate Control for ROI Scalable Video Coding", Workshop on Picture Coding and Image Processing 2010; Jul. 12, 2010-Jul. 12, 2010; Nagoya, Dec. 7, 2010 (Dec. 7, 2010), XP030082089, 2 pages.

(Continued)

*Primary Examiner* — Behrooz M Senfi
(74) *Attorney, Agent, or Firm* — Gazdzinski & Associates, PC

(57) ABSTRACT

Apparatus and methods for digital video data compression via a scalable, multi-resolution approach. In one embodiment, the video content may be encoded using a multi-resolution and/or multi-quality scalable coding approach that reduces computational and/or energy load on a client device. In one implementation, a low fidelity image is obtained based on a first full resolution image. The low fidelity image may be encoded to obtain a low fidelity bitstream. A second full resolution image may be obtained based on the low fidelity bitstream. A portion of a difference image obtained based on the second full resolution image and the first full resolution may be encoded to obtain a high fidelity bitstream. The low fidelity bitstream and the high fidelity bitstream may be provided to e.g., a receiving device.

20 Claims, 17 Drawing Sheets

Related U.S. Application Data division of application No. 15/250,748, filed on Aug. 29, 2016, now Pat. No. 9,992,502.

(60) Provisional application No. 62/289,105, filed on Jan. 29, 2016, provisional application No. 62/310,550, filed on Mar. 18, 2016.

(51) Int. Cl.
  *H04N 19/167* (2014.01)
  *H04N 19/29* (2014.01)
  *H04N 19/146* (2014.01)
  *H04N 19/59* (2014.01)

(52) U.S. Cl.
  CPC ........... *H04N 19/187* (2014.11); *H04N 19/29* (2014.11); *H04N 19/59* (2014.11)

(56) References Cited

U.S. PATENT DOCUMENTS

| | | | |
|---|---|---|---|
| 8,606,073 | B2 | 12/2013 | Woodman |
| 9,171,577 | B1 | 10/2015 | Newman |
| 9,277,122 | B1 | 3/2016 | Imura |
| 9,355,433 | B1 | 5/2016 | Adsumilli |
| 9,369,689 | B1 | 6/2016 | Tran |
| 9,478,054 | B1 | 10/2016 | Lewis |
| 9,575,803 | B2 | 2/2017 | Chauvet |
| 9,681,111 | B1 | 6/2017 | Newman |
| 9,992,502 | B2* | 6/2018 | Abbas ............... H04N 19/146 |
| 10,212,438 | B2* | 2/2019 | Abbas ............... H04N 19/146 |
| 2001/0047517 | A1 | 11/2001 | Christopoulos |
| 2003/0007567 | A1 | 1/2003 | Newman |
| 2003/0035047 | A1 | 2/2003 | Katayama |
| 2003/0234866 | A1 | 12/2003 | Cutler |
| 2005/0226483 | A1 | 10/2005 | Geiger |
| 2006/0056509 | A1* | 3/2006 | Suino ............... A63F 13/00 375/240.11 |
| 2006/0159352 | A1 | 7/2006 | Ishtiaq |
| 2006/0188014 | A1 | 8/2006 | Civanlar |
| 2006/0256397 | A1 | 11/2006 | Cui |
| 2006/0268131 | A1 | 11/2006 | Cutler |
| 2007/0025723 | A1 | 2/2007 | Baudisch |
| 2007/0064800 | A1 | 3/2007 | Ha |
| 2007/0237420 | A1 | 10/2007 | Steedly |
| 2008/0304567 | A1 | 12/2008 | Boyce |
| 2009/0180552 | A1 | 7/2009 | Visharam |
| 2010/0014780 | A1 | 1/2010 | Kalayeh |
| 2010/0054628 | A1 | 3/2010 | Levy |
| 2010/0158134 | A1 | 6/2010 | Yin |
| 2012/0092453 | A1 | 4/2012 | Sun |
| 2012/0242788 | A1 | 9/2012 | Chuang |
| 2012/0307000 | A1 | 12/2012 | Doepke |
| 2014/0152863 | A1 | 6/2014 | Drouot |
| 2014/0177706 | A1 | 6/2014 | Fernandes |
| 2014/0218354 | A1 | 8/2014 | Park |
| 2014/0258552 | A1 | 9/2014 | Oyman |
| 2014/0292751 | A1 | 10/2014 | Azar |
| 2015/0065803 | A1 | 3/2015 | Douglas |
| 2015/0109468 | A1 | 4/2015 | Laroia |
| 2015/0124877 | A1 | 5/2015 | Choi |
| 2015/0138311 | A1 | 5/2015 | Towndrow |
| 2015/0249813 | A1 | 9/2015 | Cole |
| 2015/0296231 | A1 | 10/2015 | Kwon |
| 2015/0341552 | A1 | 11/2015 | Chen |
| 2015/0341557 | A1 | 11/2015 | Chapdelaine-Couture |
| 2015/0346832 | A1 | 12/2015 | Cole |
| 2016/0012855 | A1 | 1/2016 | Krishnan |
| 2016/0014422 | A1 | 1/2016 | Su |
| 2016/0050423 | A1 | 2/2016 | Alshina |
| 2016/0065947 | A1 | 3/2016 | Cole |
| 2016/0142697 | A1 | 5/2016 | Budagavi |
| 2016/0239340 | A1 | 8/2016 | Chauvet |
| 2016/0241836 | A1* | 8/2016 | Cole ............... H04N 19/597 |
| 2016/0241892 | A1 | 8/2016 | Cole |
| 2016/0253795 | A1 | 9/2016 | Cole |
| 2016/0274338 | A1 | 9/2016 | Davies |
| 2016/0295128 | A1 | 10/2016 | Schnittman |
| 2017/0127011 | A1* | 5/2017 | Okajima ............... G09G 5/14 |
| 2017/0155924 | A1 | 6/2017 | Gokhale |
| 2017/0237983 | A1* | 8/2017 | Adsumilli ........... H04N 19/124 375/240.03 |
| 2017/0301065 | A1* | 10/2017 | Adsumilli ............... G06T 5/001 |
| 2018/0211413 | A1* | 7/2018 | Veit ............... H04N 9/735 |

FOREIGN PATENT DOCUMENTS

| | | |
|---|---|---|
| WO | 2014168972 A1 | 10/2014 |
| WO | 2015014773 A1 | 2/2015 |
| WO | 2015128634 A1 | 9/2015 |

OTHER PUBLICATIONS

Grois, et al., 'Recent Advances in Region-of-Interest Video Coding' In: 'Recent Advances on Video Coding', Jul. 5, 2011 (Jul. 5, 2011), InTech, XP055257835, ISBN: 978-953-30-7181-7 DOI: 10.5772/17789, 29 pages.

H.264 (Oct. 2012) and/or ISO/IEC 14496-10:2012, Information technology—Coding of audio-visual objects—Part 10: Advanced Video Coding, 402 pages.

High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, 657 pages.

Ichimura D., et al., 'Slice Group Map for Mult. Interactive ROI Seal', 17. JVT Meeting; 74. MPEG Meeting; 14-10-2005-21-10-2005; Nice, FR;(Joint Video Team of ISO/IEC JTC1/SC29/WG11 and ITU-T SG.16), No. JVT-Q020r1, Oct. 14, 2005 (Oct. 14, 2005), XP030006183, ISSN: 0000-0413. 20 pages.

Schwartz, E., et al., "Implementation of Compression with Reversible Embedded Wavelets," In Proc. SPIE, 1995, 12 pages.

Ugur. et al.,"MV-HEVC/SHVC HLS: On default Output Layer Sets", Jan. 2014. 4 pages.

Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.

Won, et al., 'Size-Controllable Region-of-Interest in Scalable Image Representation', IEEE Transactions on Image Processing, IEEE Service Center, Piscataway, NJ, US, vol. 20, No. 5, May 1, 2011 (May 1, 2011), pp. 1273-1280, XPO 11411787, ISSN: 1057-7149, DOI: 10.1109/TIP.2010.2090534.

Achanta R., et al., 'Slic Superpixeis Gompared to State-of-The-Art Superpixei Methods,' IEEE Transactions on Pattern Analysis and Machine intelligence, 2012, vol. 34 (11), pp. 2274-2282.

Allene C, et al 'Seamless Image-based Texture Atlases Using Multi-band Blending,' Pattern Recognition, 2008. ICPR 2008. 19th International Conference on, 2008. 4 pages.

Badrinarayanan V., et al., 'Segnet: a Deep Convoiutional Encoder-Decoder Architecture for Image Segmentation,' arXiv preprint arXiv: 1511.00561, 2015. 14 pages.

Barghout L. and Sheynin J., 'Real-world scene perception and perceptual organization: Lessons from Computer Vision'. Journal of Vision, 2013, vol. 13 (9). (Abstract). 1 page.

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.

Bay H., et al., 'Surf: Speeded up Robust Features,' European Conference on Computer Vision, Springer Berlin Heidelberg, 2006, pp. 404-417.

Beier et al., 'Feature-Based Image Metamorphosis,' in Computer Graphics Journal, Jul. 1992, vol. 28 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

(56) References Cited

OTHER PUBLICATIONS

Burt et al., 'A Multiresolution Spline with Application to Image Mosaics,' in ACM Transactions on Graphics (TOG), 1983, vol. 2, No. 4, pp. 217-236.
Chan et al., 'Active contours without edges'. IEEE Transactions on Image Processing, 2001, 10 (2), pp. 266-277 (hereinafter 'Chan').
Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.
Elen, 'Whatever happened to Ambisonics' AudioMedia Magazine, Nov. 1991. 18 pages.
Gracias, et al., 'Fast Image Blending Using Watersheds and Graph Cuts,' Image and Vision Computing, 2009, vol. 27 (5), pp. 597-607.
Herbst E., et al., 'Occlusion Reasoning for Temporal Interpolation Using Optical Flow,' Department of Computer Science and Engineering, University of Washington, Tech. Rep. UW-CSE-09-08-01,2009. 41 pages.
Jakubowski M., et al, 'Block-based motion estimation algorithmsa survey,' Opto-Eiectronics Review 21, No. 1 (2013), pp. 88-102.
Kendall A., et al., 'Bayesian Segnet: Model Uncertainty in Deep Convolutional Encoder-Decoder Architectures for Scene Understanding,' arXiv: 1511.02680, 2015. (11 pages).
Lovve D.G., 'Object Recognition From Local Scale-invariant Features,' Computer vision, The proceedings of the seventh IEEE international conference on 1999, vol. 2, pp. 1150-1157.
Mitzel D., et al., 'Video Super Resolution Using Duality Based TV-I1 Optical Flow,' Joint Pattern Recognition Symposium, 2009, pp. 432-441.
Perez et al., 'Poisson Image Editing,' in Acm Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Suzuki et al., 'Inter Frame Coding with Template Matching Averaging,' in IEEE international Conference on Image Processing Proceedings (2007), vol. (ill), pp. 409-412.
Szeliski R., "Computer Vision: Algorithms and Applications," Springer Science & Business Media, 2010, 979 pages.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Xiao, et al., 'Multiple View Semantic Segmentation for Street View Images,' 2009 IEEE 12th International Conference on Computer Vision, 2009, pp. 686-693.
Xiong Y et ai 'Gradient Domain Image Blending and Implementation on Mobile Devices,' International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.
Co-pending U.S. Appl. No. 14/927,343, filed Oct. 29, 2015, 48 pages.
Co-pending U.S. Appl. No. 14/949,786, filed Nov. 23, 2015, 70 pages.
Co-pending U.S. Appl. No. 15/001,038, filed Jan. 19, 2016, 57 pages.
Co-pending U.S. Appl. No. 29/548,661, filed Dec. 15, 2015, 15 pages.
Co-pending U.S. Appl. No. 15/289,851, filed Oct. 10, 2016, 50 pages.
Grois D., et al., 'Complexity-Aware Adaptive Spatial Pre-Processing for ROI Scalable Video Coding With Dynamic Transition Region', Image Processing (ICIP), 2011 18th IEEE International Conference on, IEEE, Sep. 11, 2011, pp. 741-744, XP032080597, DOI: 10.1109/ICIP.2011.6116661, ISBN: 978-1-4577-1304-0.
Chee Sun Won et al: "Size-Controllable Region-of-Interest in Scalable Image Representation", IEEE Transactions on Image Processing, IEEE Service Center, Piscataway, NJ, US, vol. 20, No. 5, May 1, 2011 (May 1, 2011), pp. 1273-1280, XP011411787, ISSN: 1057-7149, DOI: 10.1109/TIP.2010.2090534.

* cited by examiner

APPARATUS AND METHODS FOR VIDEO COMPRESSION USING MULTI-RESOLUTION SCALABLE CODING

PRIORITY

This application is a continuation of and claims priority to co-owned and co-pending U.S. patent application Ser. No. 15/799,837 of the same title filed Oct. 31, 2017, which is a divisional of and claims priority to co-owned U.S. patent application Ser. No. 15/250,748 of the same title filed Aug. 29, 2016 and issued as U.S. Pat. No. 9,992,502, which claims the benefit of priority to U.S. Provisional Patent Application Ser. No. 62/289,105 filed Jan. 29, 2016, entitled "Apparatus and Methods for Video Compression Using Multi-Resolution Scalable Coding", and U.S. Provisional Patent Application Ser. No. 62/310,550, filed Mar. 18, 2016, entitled "Apparatus and Methods for Video Compression Using Multi-Resolution Scalable Coding", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to storing and/or presenting of image and/or video content and more particularly in one exemplary aspect to encoding, decoding, and/or transmission of panoramic video content.

Description of Related Art

Image and/or video content may be characterized by angle of view or field of view (FOV) (e.g., diagonal view angle of about 63° for 35-mm focal length FX format camera). Image and/or video content may be presented on a display that may be characterized by smaller view angle compared to the view angle of the captured content. Such captured content may be referred to as panoramic content wherein captured image dimensions (in pixels) may be greater than dimensions of the view window during content presentation. In some implementation, panoramic content characterized by full circle FOV may be referred to as 360° and/or spherical content.

360-degree and VR content video/image data usually involves very high resolution capture of images over a wide field of view. For a great experience, image resolution may be high (up to 8K resolution per eye). Current state of the art video compression codecs like H.264, HEVC and VP9 (by themselves) may not be well suited for encoding/decoding VR and/or panoramic content. Use of traditional codecs may prove impractical for delivering VR and/or panoramic content over Internet and/or mobile networks.

Current 360-degree and VR video delivery and decoding systems may employ a number of different techniques. For example, a decoding device may receive and decode the entire highest resolution native 360-degree image and keep it in memory. As the user moves their device, the decoder/renderer moves a cropped viewpoint to reflect where the viewer wants to look. This method has limitations, such as requiring the entire 360-degree image to be sent at the highest resolution (from server), which results in high bandwidth requirements. As a result, playback over the internet may result in buffering issues. Additionally, the decoding device has to have powerful processing capabilities to decode the highest resolution 360-degree image. Moreover, the processing burden can result in significant battery usage. As a result, only a limited amount of content can be consumed before the device has to be charged.

In another example, the server sends (and the decoder decodes) only partial high resolution video. The area where the user is looking is rendered in high resolution and the rest of the image is rendered in low resolution. When the viewer moves his/her viewport, the decoder asks server to transmit video data corresponding to updated viewpoint. In this case, the server has to transmit an intra-frame in order to decode the current frame, or the decoder has to receive and decode all reference frames leading up to the last intra-frame. Both approaches have their own set of limitations: transmitting an intra frame can lead to network congestion because intra-frames are usually much larger (compared to inter-frames). Having the decoder receive and decode all prior reference frames in a closed group of pictures (GOP) will increase latency when updating the new image to a high resolution. This may also cause high bandwidth utilization.

Within this context, possible areas for improvement may leverage the limited viewing aspect; e.g., a viewer does not see the entire 360-degree world simultaneously. New algorithms are needed that minimize latency when the user moves his/her viewpoint, while still achieving high compression and low battery performance. Furthermore, ideal solutions would modify the encoding process to reuse existing hardware decoders (and not require special new hardware at the consumption side).

Panoramic (e.g., 360°) content may be viewed on a resource-restricted device (e.g., smartphone, tablet, and/or other device that may be characterized by a given amount of available energy, data transmission bandwidth, and/or computational capacity). Resources available to such resource-limited device may prove inadequate for receiving and/or decoding full resolution and/or full frame image content.

SUMMARY

The present disclosure satisfies the foregoing needs by providing, inter alia, methods and apparatus for processing image and/or video content, and more particularly in one exemplary aspect to encoding, decoding, and/or transmission of panoramic video content.

In a first aspect of the disclosure, a computerized apparatus for providing video content is disclosed. In one embodiment, the apparatus includes an electronic storage apparatus configured to store a sequence of images of a first frame resolution; a communications interface configured to enable communication of bitstreams to a client device; one or more processors configured to execute a plurality of computer readable instructions; and a storage apparatus in data communication with the one or more processors.

In one implementation, the storage apparatus includes at least one computer program, the at least one computer program having a plurality of instructions which are configured to, when executed by the one or more processors, cause the computerized apparatus to: obtain a first full resolution image at the first frame resolution from the sequence of images; obtain a low fidelity image at a second frame resolution lower than the first frame resolution based at least in part on a down-sampled version of the first full resolution image; encode the low fidelity image into a low fidelity bitstream; decode the low fidelity bitstream into a decoded low fidelity image; obtain a second full resolution image based at least in part on an up-sampled version of the decoded low fidelity image; obtain a difference image based on the second full resolution image and the first full resolution image; encode a portion of the difference image to obtain a high fidelity bitstream; and provide the low fidelity bitstream and the high fidelity bitstream via the communications interface.

In one variant, the low fidelity bitstream is characterized by at least first bitrate, and the high fidelity bitstream is characterized by at least a second bitrate. A ratio of the first bitrate to the second bitrate may be based on, e.g., a Quality of Service (QoS) parameter associated with the communications interface.

In another variant, a ratio of the second frame resolution to the first frame resolution is based at least on a resolution scalability parameter, such as e.g., from a range of two (2) to sixteen (16) inclusive.

Alternatively or additionally, the resolution scalability parameter can be based at least in part on a Quality of Service (QoS) parameter associated with the communications interface.

In a further implementation, the plurality of instructions are further configured to, when executed by the one or more processors, cause the apparatus to: down-sample the down-sampled version of the first full resolution image to obtain a lower fidelity image at a third frame resolution lower than the second frame resolution; encode the lower fidelity image into a lower fidelity bitstream; decode the lower fidelity bitstream into a decoded lower fidelity image; up-sample the decoded lower fidelity image to obtain a second low resolution image, the down-sampled version of the first full resolution image further being combined with the second low resolution image to obtain the low fidelity image; and display the obtained output view frame image via a rendering device.

In yet another implementation, the plurality of instructions are further configured to, when executed by the one or more processors, cause the apparatus to: obtain another full resolution image at the first frame resolution from the sequence of images; down-sample the another full resolution image to obtain a second low fidelity image at the second frame resolution; encode the second low fidelity image into a second low fidelity bitstream; decode the second low fidelity bitstream into a second decoded low fidelity image; up-sample the second decoded low fidelity image to obtain a third full resolution image; obtain a second difference image based on the another full resolution image and the third full resolution image; encode a second portion of the second difference image relative to the difference image to obtain a second high fidelity bitstream; and provide the second low fidelity bitstream and the second high fidelity bitstream via the communications interface. The full resolution image and the another full resolution image may collectively comprise a stereo image.

In another aspect of the disclosure, a method for providing video content is disclosed. In one embodiment, the method includes: obtaining a first panoramic image by decoding a first bitstream using a first decoder; obtaining a view frame image by at least decoding a second bitstream using a second decoder; obtaining a second panoramic image at least in part by up-sampling the first panoramic image to the resolution of the view frame image; obtaining an output view frame image at least in part by combining the view frame image and the second panoramic image; and providing the obtained output view frame image to a rendering device.

In one implementation, the first panoramic image comprises a low fidelity image characterized by at least a first resolution, and the second panoramic image comprises a high fidelity image characterized by at least a second resolution that is greater than the first resolution, with a ratio of the first resolution to the second resolution is characterized by a resolution scalability parameter.

In another implementation, the resolution scalability parameter is based at least on a display capability of a display device; and the method further includes displaying the output view frame image via the display device. Alternatively or additionally, the resolution scalability parameter is based at least on a processing or memory limitation of the display device.

In yet another implementation, the method further includes obtaining an intermediate image by at least decoding an intermediate bitstream using at least a third decoder; the up-sampling the first panoramic image to the resolution of the view frame image further includes combining the intermediate image with the first panoramic image.

In another embodiment, the method for providing video content includes: obtaining a first high fidelity image; obtaining a low fidelity image based at least on the first high fidelity image; encoding the low fidelity image according to a scalable parameter to produce an encoded low fidelity image; obtaining a second high fidelity image based at least on the low fidelity image; obtaining a difference image based at least on the second high fidelity image and the first high fidelity image; encoding a portion of the difference image corresponding to a viewport; and providing the encoded low fidelity image and the encoded portion of the difference image to a display device via a communications link.

In one variant of this embodiment, the scalable parameter is based at least in part on a limitation of the display device, and or a limitation of the communications link.

In yet another embodiment, the method for providing video content includes: for a first viewport display, obtaining a first output image by combining a panoramic image and a first difference image for first coordinates of the first viewport display; determining when a change occurs in the first viewport display; responsive to the change, requesting a second difference image; and obtaining a second output image for the first viewport display by combining the panoramic image and the second difference image.

In one implementation of the method, at least one of a resolution quality, a size, and/or a bitrate associated with the second difference image is a scaled according to a Quality of Service (QoS) parameter.

In a further aspect, an integrated circuit (IC) device configured for image or video data processing is disclosed. In one embodiment, the IC device is fabricated using a silicon-based semiconductive die and includes logic configured to implement encoding, decoding, and/or transmission of panoramic video content. In one variant, the IC device is a system-on-chip (SoC) device with multiple processor cores, and is configured to utilize various of the cores to perform at least down-sampling of full resolution images encoding of the resultant low fidelity image into a low fidelity bitstream; decoding of the low fidelity bitstream into a decoded low fidelity image; up-sampling of the decoded low fidelity image; image differencing based on first and second full resolution images; and encoding a portion of a difference image to obtain a high fidelity bitstream.

In yet a further aspect, a method of utilizing a resource-constrained receiving or rendering device to render high-resolution video data is disclosed. In one embodiment, the method includes selectively performing down-sampling and subsequent difference processing on one or more frames of high-resolution video data to enable transmission of both high-fidelity and low-fidelity bitstreams associated with the frames to the receiving or rendering device, thereby enabling rendering thereat using reduced resources as compared to the high resolution frames alone.

In another aspect, a data structure useful in, e.g., video data processing is disclosed. In one embodiment, the data structure includes both low-fidelity and high-fidelity bitstreams. The bitstreams are configured to (collectively) enable a reduced-capacity receiving/rendering device to render the (source) high-resolution imagery effectively.

In another aspect of the present disclosure, a method of obtaining an image responsive to a change of a viewport is disclosed. In one embodiment thereof, the method includes: obtaining a difference image based at least on a first full-resolution image and a second full-resolution image; encoding a portion of the difference image to produce an encoded portion, the encoded portion corresponding to a position of the viewport; and providing, via a communications interface to a client device, at least the encoded portion corresponding to the position of the viewport.

In another aspect of the present disclosure, a non-transitory computer-readable apparatus is disclosed. In one embodiment, the non-transitory computer-readable apparatus includes a storage medium, the storage medium including a computer program comprising a plurality of instructions which are configured to, when executed by one or more processor apparatus, cause a computerized apparatus to: obtain a residual image based on a first full-resolution image and a second full-resolution image; detect a portion of the obtained residual image, the portion being viewed by a user; encode the portion of the obtained residual image; produce a high-fidelity bitstream based at least on the encode of the portion of the obtained residual image; and provide at least the produced high-fidelity bitstream to a client device of the user.

In another aspect of the present disclosure, computerized apparatus for providing video content is disclosed. In one embodiment, the computerized apparatus includes: a processing apparatus; a network interface in data communication with the processing apparatus; and a non-transitory computer-readable apparatus comprising a storage medium, the storage medium including a computer program comprising a plurality of instructions which are configured to, when executed by the processing apparatus, cause a computerized apparatus to: derive a difference image based at least on a first image and a second image; encode a portion of the derived difference image to generate an encoded portion, the encoded portion corresponding to a position of a viewport as reflected in data received from at least one client device via the network interface; and provide to the network interface for distribution to the at least one client device, at least the encoded portion of the difference image corresponding to the position of the viewport.

Other features and advantages of the present disclosure will immediately be recognized by persons of ordinary skill in the art with reference to the attached drawings and detailed description of exemplary embodiments as given below.

Figure 1A:
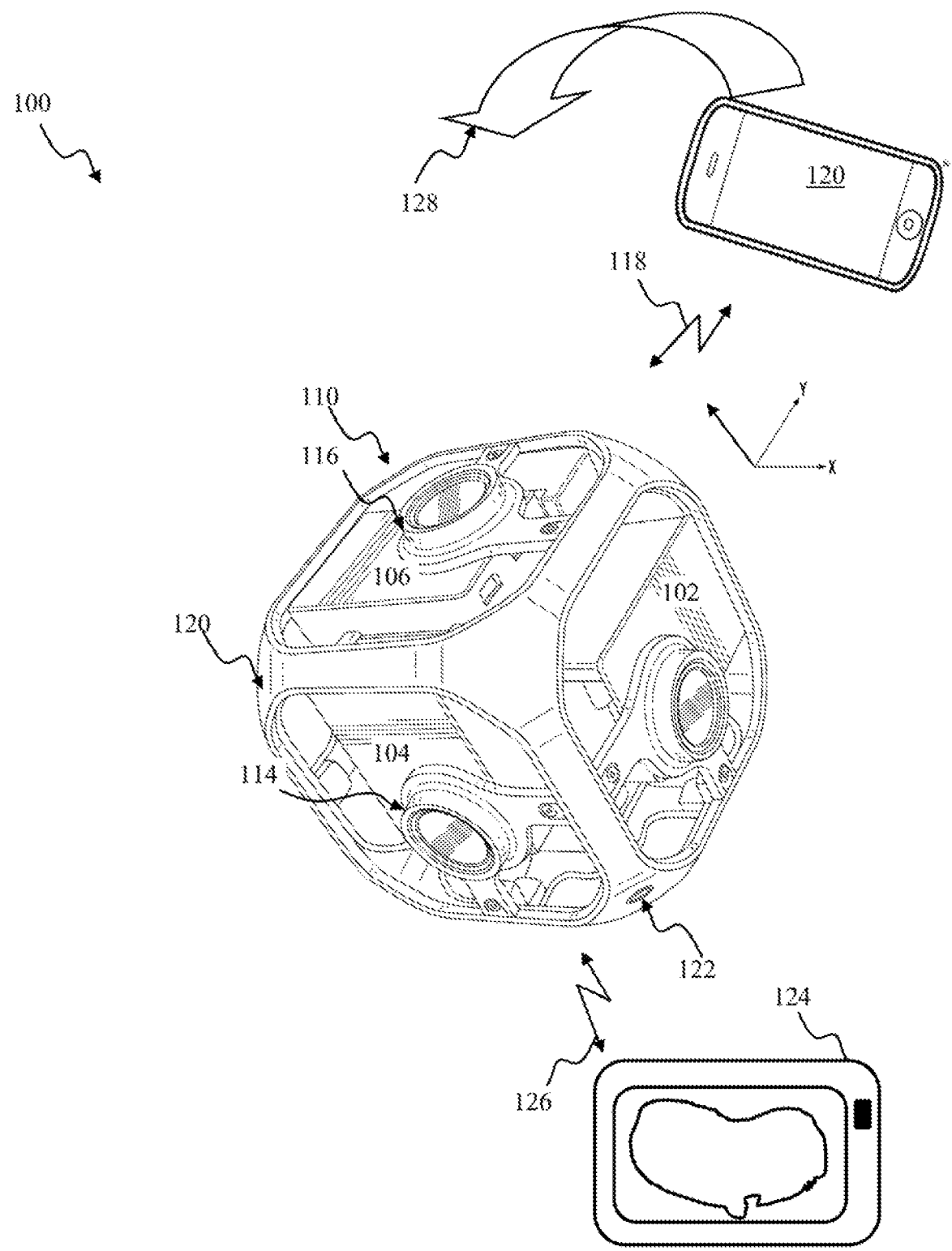
FIG. 1A is a logical block diagram illustrating a system for panoramic content capture and viewing in accordance with one implementation of the disclosure.

All Figures disclosed herein are © Copyright 2016 GoPro, Inc. All rights reserved.

DETAILED DESCRIPTION

Implementations of the various aspects of present technology are described in detail with reference to the drawings, which are provided as illustrative examples in order to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Apparatus and methods for providing video content using multi-resolution scalable coding are provided. Panoramic content (e.g., content captured using 180-degrees, 360-degrees view field and/or other field of view) and/or virtual reality (VR) content, may be characterized by high image resolution (e.g., 7860 by 4320 pixels (8K)) and/or high bit rates (e.g., up to 100 megabits per second (mbps)). Presently available standard video compression codecs, e.g., H.264 (described in ITU-T H.264 (January 2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC), also known as H.265, described in e.g., ITU-T Study Group 16—Video Coding Experts Group (VCEG)—ITU-T H.265, and/or ISO/IEC JTC 1/SC 29/WG 11 Motion Picture Experts Group (MPEG)—publishes the HEVC standard as ISO/IEC 23008-2:2015, each of the foregoing incorporated herein by reference in its entirety, and/or VP9 video codec, may prove non-optimal for providing a viewport portion of panoramic content, especially to resource-limited devices.

When viewing panoramic and/or VR content using a viewport, the server or other entity may send (and the decoder may decode) a portion of high-resolution video. The area where the user is looking (i.e., the region on which their vision is focused) may be in high resolution, and rest of the image may be in low resolution. When the viewer moves his/her viewport, the decoder may ask the server to transmit video data corresponding to updated viewport. Using methodology of the disclosure, the server or other entity may advantageously transmit new high fidelity content for the new viewport position with better performance than what is available using prior art solutions. The decoder may use existing (buffered) lower fidelity content and combine it with the new high fidelity content. Such an approach may, inter alia, decrease latency of switching from low fidelity image to high fidelity image, alleviate the need of transmitting one or more high fidelity intra frames, reduce network congestion, and/or reduce energy used by the decoding device.

One difference in VR content consumption (when compared to traditional video) is that the viewer is not seeing the entire 360-degrees world simultaneously. Therefore, the approaches described herein may enable reduction in latency when the user moves his/her viewpoint, while still achieving comparatively high compression and battery consumption. Furthermore, the encoding process may be modified (whether statically or dynamically), and yet still advantageously allow the use of existing hardware decoders (and hence not require specially adapted or new hardware at the consumption side).

Figure 2:
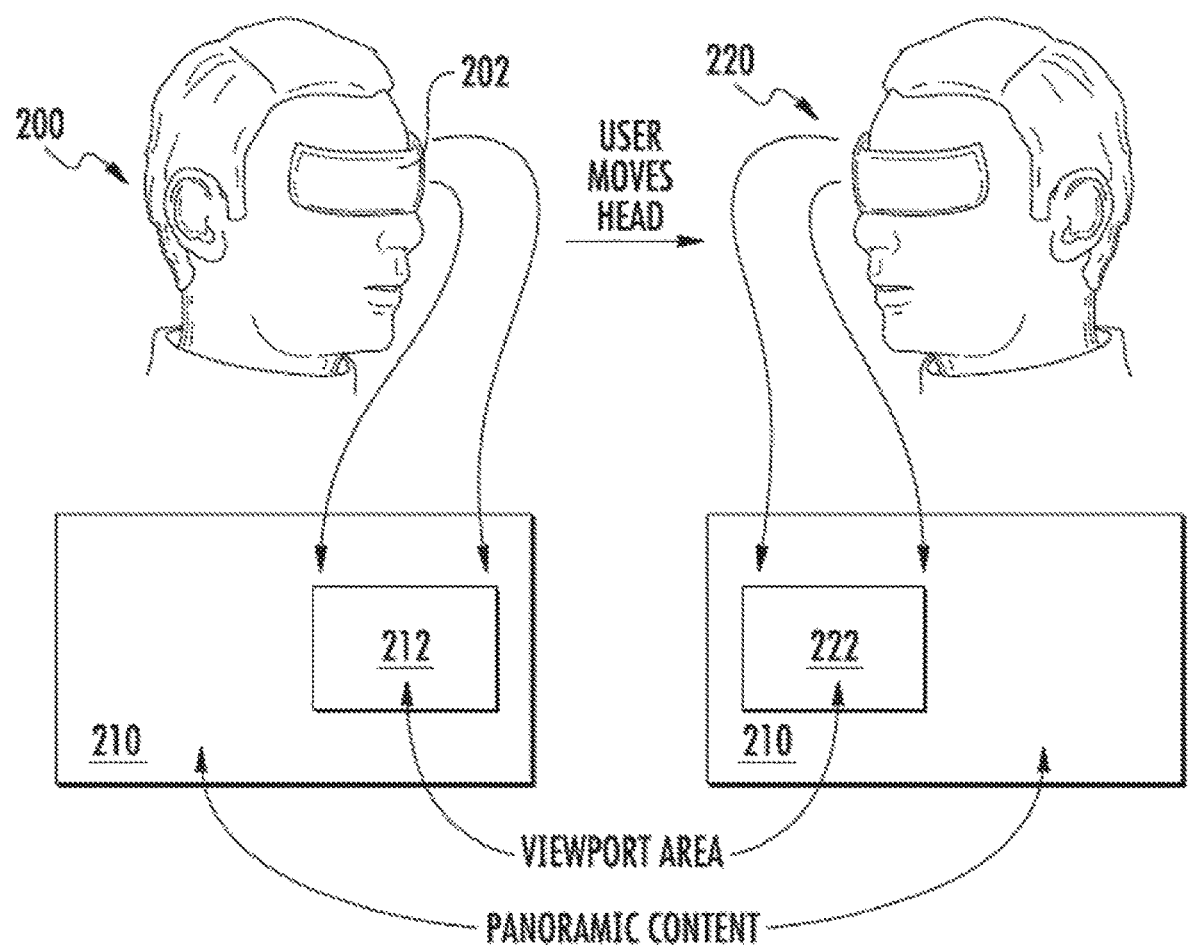
FIG. 2 is a graphical illustration depicting viewport change when viewing panoramic content, in accordance with one implementation.

Panoramic and/or virtual reality content may be viewed by a client device using a viewport to the extent of the panoramic image. In some implementations of the present disclosure, viewing dimension(s) of the viewport may be configured smaller than the extent dimension(s) of the content (e.g., a viewport covering 1280 pixels wide by 720 pixels in height may be used to view content that was obtained over area 3840 pixels in width and 2160 pixels in height). It is noteworthy that although rectangular viewport shape is shown in FIG. 2 blocks 212 and 222, the viewport is not limited to rectangular shapes. Non-rectangular shapes (e.g., contoured rectangle, contoured trapezoid, and/or trapezoid) may be utilized in some implementations. Additionally, the client device(s) may include a portable media device characterized by given energy, thermal, and/or computational resources. Notably, video content may be encoded using the multi-resolution and/or multi-quality scalable coding approach described herein, in order to reduce computational, thermal and/or energy load on the client device.

Figure 3A:
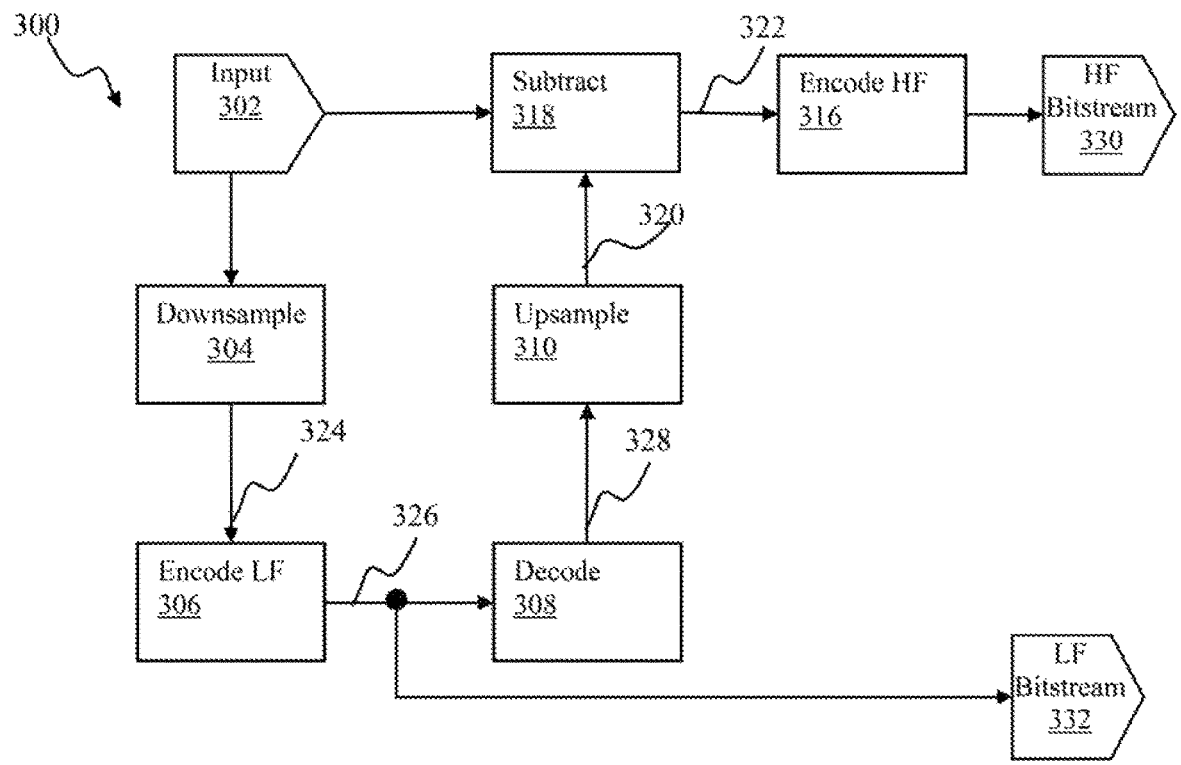
FIGS. 3A and 3B are functional block diagrams illustrating spatial scalability encoder/decoder configuration, respectively, usable for providing viewable panoramic content, in accordance with one implementation.

As shown in FIG. 3A, input to the exemplary system is a high-resolution image 302. A lower resolution image (LRI), indicated by 324, may be obtained based on a first higher resolution image (HRI) (present at the input 302). A second HRI 320 may be obtained by up-sampling the lower resolution image. A difference image 322 may be obtained based on the second HRI and the first HRI; e.g., via a differencing or subtraction process 318. This difference image may also be encoded per an encoder process 316. In some implementations, a portion of the difference image corresponding to the view port may be encoded. The encoded portion (or the encoded difference image) may be provided to the client device along with the encoded LRI bitstream 332. The LRI bitstream is referred to in the present example as the base layer (BL) bitstream or low-fidelity (LF) output, while the encoded difference image bitstream is referred to as an enhancement layer (EL) or high-fidelity (HF) output.

The decoder(s) of the client device may utilize in one implementation two bitstreams (e.g., the base layer and the enhancement layer) to obtain image and/or video content for the viewport. It is noteworthy, that the exemplary content delivery methodology of the disclosure enables a decoder of the client device to obtain an image frame at a given time based on the BL and EL images for that given time, and without necessitating delivery of "reference" or other images from prior time instances. Responsive to a viewport change, information provided by the BL and EL bitstreams may advantageously be utilized to reconstruct video for the new viewport without retransmission of reference frames.

The content delivery methodologies of the present disclosure may be utilized for facilitating virtual reality (VR) content delivery, video conferencing, video game streaming or immersive experiences when viewing spherical (e.g., 360-degrees content), and/or virtual reality applications, among others.

FIG. 1A illustrates a capture system configured for acquiring panoramic content, in accordance with one implementation. The system 100 of FIG. 1A may include a capture apparatus 110, e.g., such as GoPro action camera, e.g., HERO4 Silver.

The capture apparatus 110 may include 6-cameras (e.g., 104, 106, 102) disposed in a cube-shaped cage 120. The cage 120 dimensions may be selected between 25 mm and 150 mm, preferably 105 mm in some implementations. The cage 120 may be outfitted with a mounting port 122 configured to enable attachment of the camera to a supporting structure (e.g., tripod, photo stick). The cage 120 may provide a rigid support structure. Use of a rigid structure may ensure that orientation of individual cameras with respect to one another may remain at a given configuration during operation of the apparatus 110.

Individual capture devices (e.g., 102) may comprise a video camera device, such as described in, e.g., such as described in U.S. patent application Ser. No. 14/920,427 entitled "APPARATUS AND METHODS FOR EMBEDDING METADATA INTO VIDEO STREAM" filed on 22 Oct. 2015, the foregoing being incorporated herein by reference in its entirety.

In some implementations, the capture device may include two camera components (including a lens and imaging sensors) that are disposed in a Janus configuration, e.g., back to back such as described in U.S. patent application Ser. No. 29/548,661, entitled "MULTI-LENS CAMERA" filed on 15 Dec. 2015, the foregoing being incorporated herein by reference in its entirety.

The capture apparatus 110 may be configured to obtain imaging content (e.g., images and/or video) with 360° field of view, also referred to as panoramic or spherical content, e.g., such as shown and described in U.S. patent application Ser. No. 14/949,786, entitled "APPARATUS AND METHODS FOR IMAGE ALIGNMENT" filed on 23 Nov. 2015, and/or U.S. patent application Ser. No. 14/927,343, entitled "APPARATUS AND METHODS FOR ROLLING SHUTTER COMPENSATION FOR MULTI-CAMERA SYSTEMS", filed 29 Oct. 2015, each of the foregoing being incorporated herein by reference in its entirety.

Individual cameras (e.g., 102, 104, 106) may be characterized by field of view 120° in a longitudinal dimension and 90° in a latitudinal dimension. In order to provide for an increased overlap between images obtained with adjacent cameras, image sensors of any two adjacent cameras may be configured at 900 with respect to one another. By way non-limiting illustration, the longitudinal dimension of camera 102 sensor may be oriented at 90° with respect to the longitudinal dimension of the camera 104 sensor; the longitudinal dimension of the camera 106 sensor may be oriented at 900 with respect to the longitudinal dimension 116 of the camera 104 sensor. The camera sensor configuration illustrated in FIG. 1A, may provide for 420° angular coverage in vertical and/or horizontal planes. Overlap between fields of view of adjacent cameras may provide for an improved alignment and/or stitching of multiple source images to produce, e.g., a panoramic image, particularly when source images may be obtained with a moving capture device (e.g., rotating camera).

Individual cameras of the apparatus 110 may comprise a lens (e.g., lens 114 of the camera 104, lens 116 of the camera 106). In some implementations, the individual lens may be characterized by what is referred to as "fish-eye" pattern, and produce images characterized by a fish-eye (or near fish-eye) field of view (FOV). Images captured by two or more individual cameras of the apparatus 110 may be combined using stitching of fish-eye projections of captured images to produce an equirectangular planar image, in some implementations, e.g., such as detailed in U.S. patent application Ser. No. 14/920,427 entitled "APPARATUS AND METHODS FOR EMBEDDING METADATA INTO VIDEO STREAM" filed on 22 Oct. 2015, incorporated supra.

The capture apparatus 110 may house one or more internal metadata sources, e.g., video, inertial measurement unit, global positioning system (GPS) receiver component and/or other metadata source. In some implementations, the capture apparatus 110 may comprise a device described in detail in U.S. patent application Ser. No. 14/920,427, entitled "APPARATUS AND METHODS FOR EMBEDDING METADATA INTO VIDEO STREAM" filed on 22 Oct. 2015, incorporated supra. The capture apparatus 110 may comprise one or optical elements 102. Individual optical elements 116 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element.

The capture apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensor. The capture apparatus 110 may include one or more microphones configured to provide audio information that may be associated with images being acquired by the image sensor.

The capture apparatus 110 may be interfaced to an external metadata source 124 (e.g., GPS receiver, cycling computer, metadata puck, and/or other device configured to provide information related to system 100 and/or its environment) via a remote link 126. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementation, the capture apparatus 110 may be configured to provide panoramic content (or portion thereof) to the device 120 for viewing.

In one or more implementations, individual links 126, 118 may utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, individual links 126, 118 may be effectuated using a wired interface, e.g., HDMI, USB, digital video interface, display port interface (e.g., digital display interface developed by the Video Electronics Standards Association (VESA), Ethernet, Thunderbolt), and/or other interface.

In some implementations (not shown) one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, heart rate, and/or other sensors). The metadata obtained by the capture apparatus 110 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on 22 Oct. 2015, incorporated supra.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox); perform full remote control of camera 110 functions, live preview video being captured for shot framing, mark key moments while recording with HiLight Tag, View HiLight Tags in GoPro Camera Roll for location and/or playback of video highlights, wirelessly control camera software, and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

A user may utilize the device 120 to view content acquired by the capture apparatus 110. Display of the device 120 may act as a viewport into 3D space of the panoramic content. In some implementation, the user interface device 120 may communicate additional information (metadata) to the camera apparatus 110. By way of an illustration, the device 120 may provide orientation of the device 120 with respect to a given coordinate system, to the apparatus 110 so as to enable determination of a viewport location and/or dimensions for viewing of a portion of the panoramic content. By way of an illustration, a user may rotate (sweep) the device 120 through an arc in space (as illustrated by arrow 128 in FIG. 1A). The device 120 may communicate display orientation information to the capture apparatus 110. The capture apparatus 110 may provide an encoded bitstream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

Figure 1B:
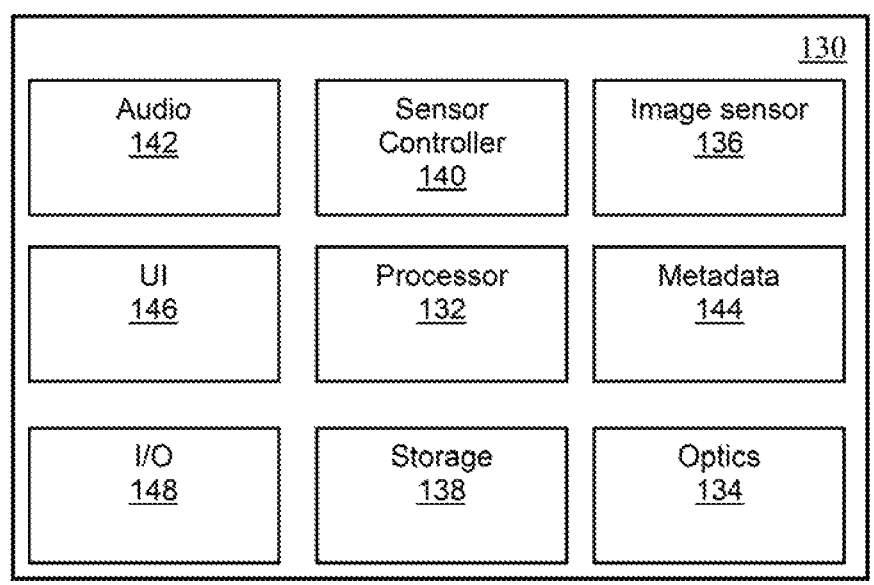
FIG. 1B is a functional block diagram illustrating a capture device for use with, e.g., system of FIG. 1A in accordance with one implementation.

FIG. 1B illustrates one implementation of a camera apparatus for collecting metadata and content. The apparatus of FIG. 1B may comprise a capture device 130 that may include one or more processors 132 (such as system on a chip (SOC), microcontroller, microprocessor, CPU, DSP, ASIC, GPU, and/or other processors) that control the operation and functionality of the capture device 130. In some implementations, the capture device 130 in FIG. 1B may correspond to an action camera configured to capture photo, video and/or audio content.

The capture device 130 may include an optics module 134. In one or more implementations, the optics module 134 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optics module 134 and to produce image(s) data based on control signals from the sensor controller 140. Optics module 134 may comprise focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include without limitation, video, audio, capacitive, radio, vibrational, ultrasonic, infrared sensors, radar, LIDAR and/or sonar, and/or other sensory devices.

The apparatus 130 may include one or more audio components (e.g., microphone(s) embodied within the camera (e.g., 142). Microphones may provide audio content information.

The apparatus 130 may include a sensor controller module 140. The module 140 may be used to operate the image sensor 136. The controller may receive image or video input from the image sensor 136; audio information from one or more microphones, such as 142. In some implementations, audio information may be encoded using e.g., AAC, AC3, MP3, linear PCM, MPEG-H, and/or other audio coding format (audio codec). In one or more implementations of spherical video and/or audio, the audio codec may comprise a 3-dimensional audio codec e.g., Ambisonics codec.

The apparatus 130 may include one or more metadata modules embodied (e.g., 144) within the camera housing and/or disposed externally to the camera. The processor 132 may interface to the sensor controller and/or one or more metadata modules 144. Metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content. Metadata module 144 may obtain information related to environment of the capture device and aspect in which the content is captured. By way of a non-limiting example, an accelerometer may provide device motion information, comprising velocity and/or acceleration vectors representative of motion of the capture device 130; the gyroscope may provide orientation information describing the orientation of the device 130, the GPS sensor may provide GPS coordinates, time, identifying the location of the device 130; and the altimeter may obtain the altitude of the camera 130. In some implementations, internal metadata module 144 may be rigidly coupled to the capture device 130 housing such that any motion, orientation or change in location experienced by the device 130 is also experienced by the metadata sensors 144. The sensor controller 140 and/or processor 132 may be operable to synchronize various types of information received from the metadata sources. For example, timing information may be associated with the sensor data. Using the timing information metadata information may be related to content (photo/video) captured by the image sensor 136. In some implementations, the metadata capture may be decoupled form video/image capture. That is, metadata may be stored before, after, and in-between one or more video clips and/or images. In one or more implementations, the sensor controller 140 and/or the processor 132 may perform operations on the received metadata to generate additional metadata information. For example, the microcontroller may integrate the received acceleration information to determine the velocity profile of the capture device 130 during the recording of a video. In some implementations, video information may consist of multiple frames of pixels using any applicable encoding method (e.g., H262, H.264, Cineform and/or other standard).

The apparatus 130 may include electronic storage 138. The electronic storage 138 may comprise a system memory module is configured to store executable computer instructions that, when executed by the processor 132, perform various camera functionalities including those described herein. The electronic storage 138 may comprise storage memory configured to store content (e.g., metadata, images, audio) captured by the apparatus.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 130. The processing module 132 may interface to the sensor controller 140 in order to obtain and process sensory information for, e.g., object detection, face tracking, stereo vision, and/or other tasks.

The processing component 132 may interface with the mechanical, electrical sensory, power, and user interface 146 modules via driver interfaces and/or software abstraction layers. Additional processing and memory capacity may be used to support these processes. It will be appreciated that these components may be fully controlled by the processing module 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system may be remotely disposed from one another, and/or aggregated. For example, one or more sensor components may be disposed distal from the capture device, e.g., such as shown and describe with respect to FIG. 1A. Multiple mechanical, sensory, or electrical units may be controlled by a learning apparatus via network/radio connectivity.

The apparatus 130 may include user interface (UI) module 146. The UI module 146 may comprise virtually any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the camera apparatus 130.

The apparatus 130 may include an input/output (I/O) interface module 148. The I/O interface module 148 may be configured to synchronize the capture device 130 with other cameras and/or with other external devices, such as a remote control, a second capture device 130, a smartphone, a client device 120 of FIG. 1A and/or a video server. The I/O interface module 148 may be configured to communicate information to/from various I/O components. In some implementations the I/O interface module 148 may comprise a wired and/or wireless communications interface (e.g. WiFi, Bluetooth, USB, HDMI, Wireless USB, Near Field Communication (NFC), Ethernet, a radio frequency transceiver, and/or other interfaces) configured to communicate to one or more external devices (e.g., devices 124, 122, 120 in FIG. 1A and/or metadata source). In some implementations, the I/O interface module 148 may interface with LED lights, a display, a button, a microphone, speakers, and/or other I/O components. In one or more implementations, the I/O interface module 148 may interface to energy source, e.g., battery and/or DC electrical source. The communications interface of the apparatus 130 may include one or more connections to external computerized devices to allow for, inter alia, configuration and/or management of remote devices e.g., as described above with respect to FIG. 1A and/or with respect to FIGS. 2A-2B. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The apparatus 130 may include a power system that may be tailored to the needs of the application of the device. For example, for a small-sized lower power action camera, a wireless power solution (e.g. battery, solar cell, inductive (contactless) power source, rectification, and/or other) may be used.

FIG. 2 illustrates viewport change when viewing panoramic content, in accordance with one implementation. In some implementations a user may view panoramic content using a virtual reality (VR) headset, 202 in FIG. 2. Headset 202 may include a sensor component configured to provide information related to orientation and/or motion of headset 202. In some implementations, the sensor component may include an accelerometer, a tilt sensor, a compass, a heading sensor, a gyroscope, and/or other sensor.

VR and 360-degree content may be consumed using a portable user interface device, e.g., a smartphone with a touchscreen. A user may utilize the touchscreen to move the viewport or move the device around physically to request an updated viewport. In some implementations wherein the smartphone may be equipped with a motion and/or orientation sensor (e.g., a gyroscope and/or accelerometer) that can capture device position with significant accuracy, motion of the smartphone within a 360° environment may be detected, and used for adjusting the viewport.

When headset 202 is pointing in a given direction, e.g., as shown in panel 200 in FIG. 2, the viewport associated with the position of headset 202 may be denoted by area 212 within the panoramic image frame 210. As used herein the terms "viewport" and/or "view area" may be used to describe a portion of view field that may be used for viewing panoramic content that may be characterized by content view field (e.g., shown by frame 210 in FIG. 2). When panoramic content is presented on a two-dimensional display device, the viewport may denote a two-dimensional area (e.g., 212) within the 2-dimensional projection of the acquired panoramic content (frame 210).

When providing a portion of the panoramic content (e.g., viewport 212) to a client device, a portion of the content corresponding to the present viewport may be encoded, transmitted, and/or decoded to reduce load on a content server, transmission resource (e.g., bandwidth, energy) utilization, and/or client device decoder load. Viewport changes may necessitate content bitstream adjustment. By way of an illustration, as head of the user moves from configuration 200 to configuration 220 in FIG. 2, the viewport may change, e.g., from area 212 to area 222 within the panoramic content frame 210. Accordingly, the content providing entity (e.g., content server) may need to transition from providing bitstream from content within the area 212 to content associated with the area 222.

FIGS. 3A-3F illustrate scalable encoding/decoding methodology that may enable provision and/or viewing of panoramic content using reduced computational, energy transmission bandwidth resources.

FIG. 3A illustrates spatial scalability encoder configuration, that may be employed on a content server side when providing viewable panoramic content, in accordance with one implementation. Encoder configuration 300 may be implemented by a computerized system 900 of FIG. 9A described herein.

Figure 9A:
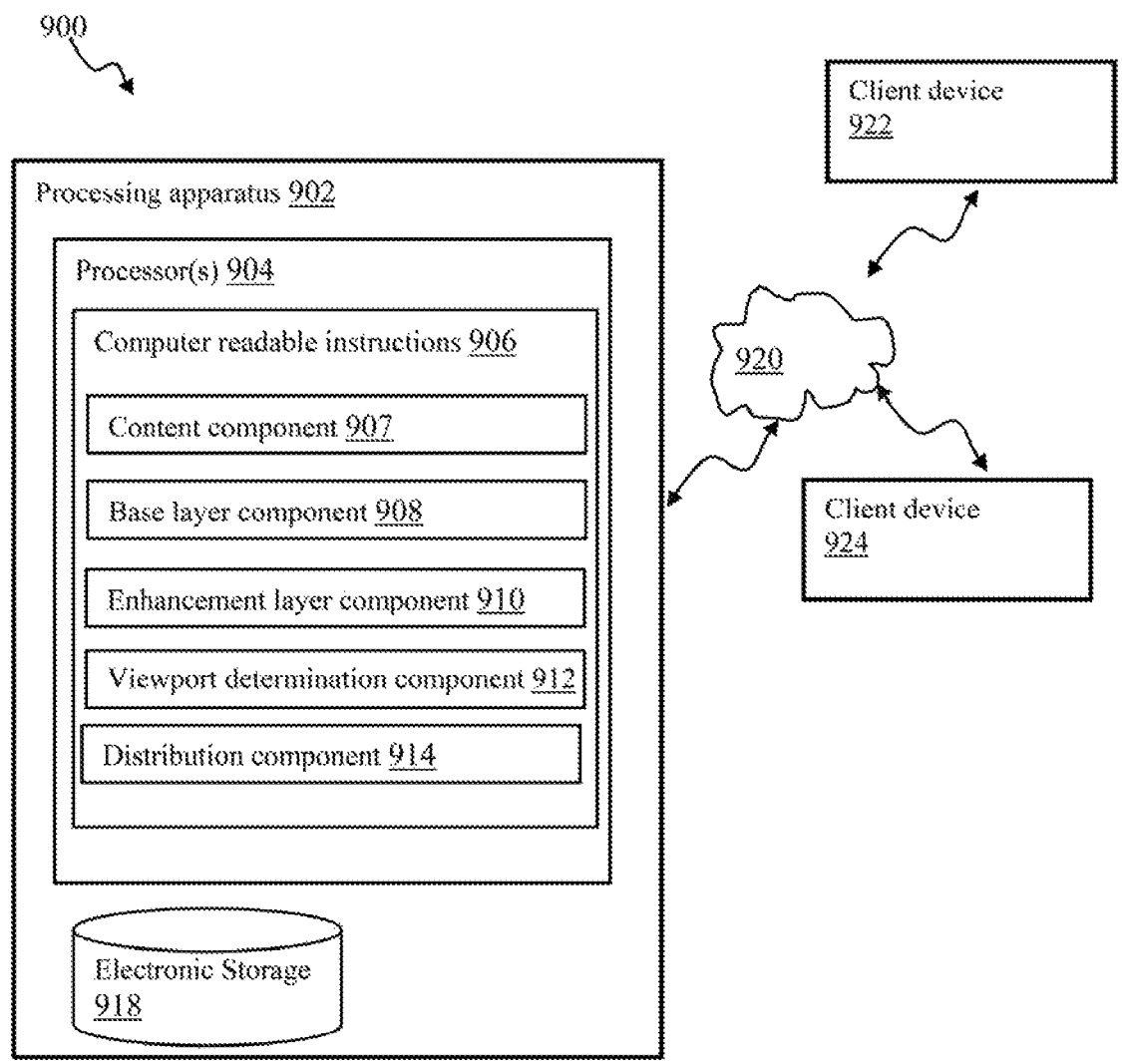
FIG. 9A is a functional block diagram illustrating a system for encoding content using scalable architecture of the disclosure, in accordance with one implementation.

Encoder configuration 300 in FIG. 3A may be configured to obtain two bitstreams, e.g., base layer (BL) 332 and enhancement layer (EL) 330 for delivery to a target destination (e.g., client device 922 of FIG. 9A and/or device 120 of FIG. 1A). Base layer 332 bitstream may be obtained as follows. Input 302 may be obtained. In some implementations, the input 302 may correspond to one or more panoramic images. Individual panoramic images (also referred to as full resolution full frame images) may correspond to a stitched two-dimensional image (e.g., rectilinear, planar equirectangular, and/or other projection) such as shown by frame 210 in FIG. 2, obtained with a panoramic capture device, e.g., device 110 of FIG. 1A. In some implementations, input 302 may correspond to a wide angle image obtained with a wide angle lens (e.g., from 120-degrees to 190-degrees field of view). In some virtual reality implementations, e.g. such as described with respect to FIGS. 3C-3F, input 302 may include stereo images consisting of pairs of images (e.g., one for each eye/camera).

Input 302 may be provided by a processor (e.g., 132 in FIG. 1B) in operable communication with one or more imaging sensors and/or obtained from electronic storage (e.g., 918 in FIG. 9A). In some implementations, the input 302 may include 8K image and be characterized by 7680 by 4320 pixels resolution, 7680 by 2160 pixels resolution, and/or other resolution in excess of, e.g., full high definition (HD) resolution of 1920 by 1080 pixels.

One or more input images 302 may be provided to a down-sampling component 304 configured to produce reduced resolution imaged 324. The down-sampling factor may be selected between 2 and 16, e.g., 4 in some implementations. By way of an illustration, for 7680 by 4320 image 302, the down-sampled image 324 may be characterized by full HD resolution of 1920 by 1080 pixels.

The down-sampled (lower resolution) image 324 may be encoded by an encoder 306 to obtain low fidelity (LF) output bitstream 326. The encoder 306 may be configured using any applicable encoder, e.g., block based encoders e.g., H.264, HEVC, V9, wavelet based encoders e.g., JPEG 2000, lossless encoder and/or any practical image encoder. In some implementations, the encoder 306 operation may be bypassed, which would amount to no compression of the image 324. The encoded LF output bitstream 326 may be provided to a target destination as depicted by component 332.

Encoder 306 may be optimized for input characteristics. By way of an illustration, given that input into encoder 306 corresponds to down-sampled image, the input may contain fewer high frequency features. As a result, the encoder may make biased decisions to optimize quality for this down-sampled image and/or use this assumption to speed up encoding. During this encoding, the encoder may be configured to save encoding results e.g., such as motion vector and transformation in order to use in the encoding stage 316.

The encoded down-sampled bitstream 326 may be decoded by decoder 308 to obtain decoded lower resolution image 328. The decoder 308 may be configured to match encoding process 306 using any applicable methodology, e.g., block based decoders like H.264, HEVC, V9, wavelet based decoders like JPEG 2000, and/or no decoding (if 324 is not being encoded).

The decoded image 328 may be up-sampled by process 310. The up-sampling process 310 may be configured reciprocal of the down-sampling process 304 such that operation of process 310 may be configured to obtain up-sampled image 320 at the resolution of the input image 302. By way of an illustration, for 7680 by 4320 pixels image 302, the down-sampled image 324 may be characterized by full HD resolution of 1920 by 1080 pixels; the up-sampled image 320 may be characterized by 7680 by 4320 pixels resolution.

The up-sampled decoded image 320 may be subtracted from the original high resolution image 302 to produce residual or difference image 322. In some implementations, the subtraction process may be configured to implement a pixel-wise subtraction. For multi-channel images (e.g., RGB, YUV), subtraction operation may be effectuated for individual channel of multiple channels.

The difference image 322 may be encoded by high fidelity (HF) encoder 316 to produce high fidelity output bitstream 330. In some applications, this is also called enhancement layer (EL) bitstream.

Input 322 into encoder 316 may contain less energy at lower frequencies (large special scales) and more energy as higher frequencies (small spatial scales) compared to the input 302.

Figure 10A:
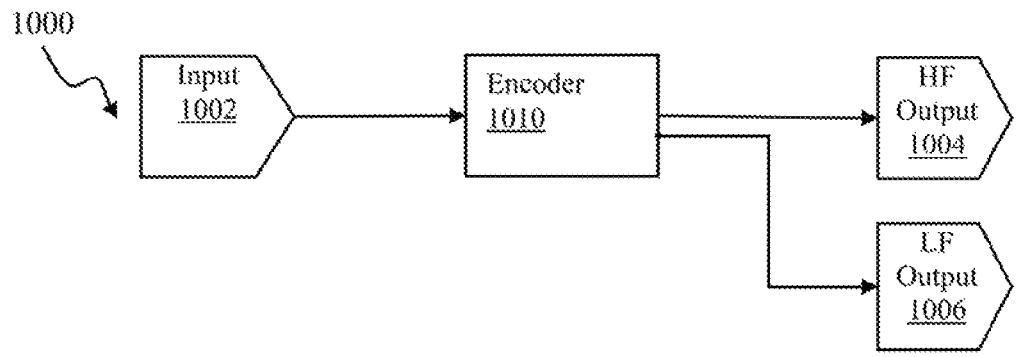
FIGS. 10A-10C are functional block diagrams illustrating scalability encoder configurations useable for providing viewable panoramic content, in accordance with some implementations.
Figure 10B:
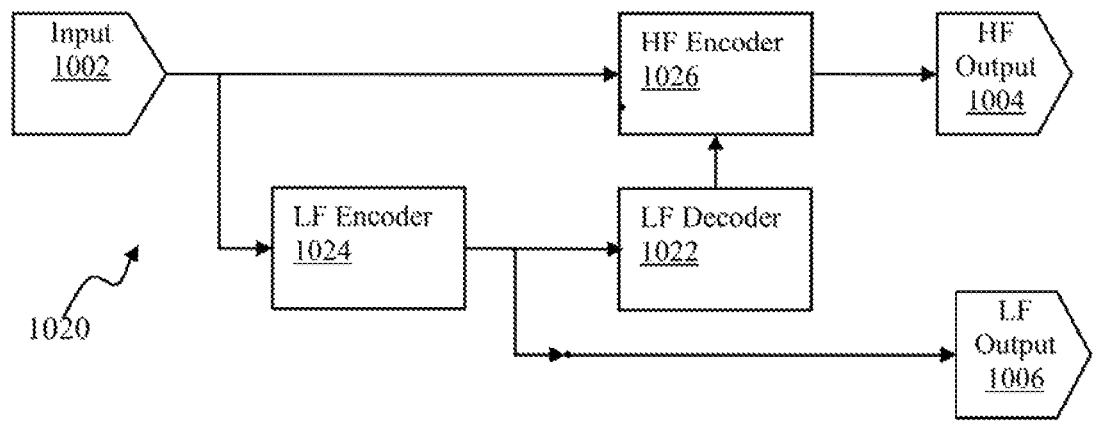
Figure 10C:
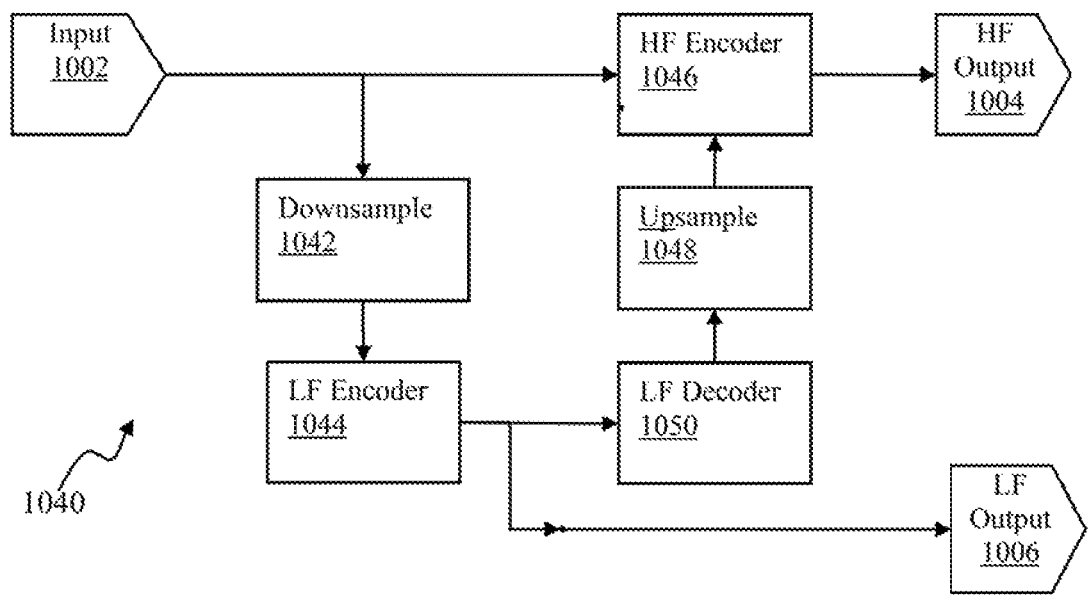

In some implementations, e.g., such as illustrated in FIGS. 10A-10C, subtraction 318 and encoding operations may be effectuated by the high fidelity encoder component, e.g., encoder 1010 of the system 1000 of FIG. 10A, encoder 1026 of the system 1020 of FIG. 10B encoder 1046 of the system 1040 of FIG. 10C.

In these implementations, input to the subtraction-component may include the high resolution input 302 and up-sampled decoded reconstructed input 320 of FIG. 3A.

In some implementations, the up-sampling 310 and subtraction 318 operations may be effectuated by the HF encoder, e.g., encoder 1010 of system 1000 of FIG. 10A, and/or encoder 1046 of the system 1040 of FIG. 10C. In this case, the input to encoder may include the high resolution input 302 and decoded reconstructed content 328.

In some implementations, the down-sampling operations (e.g., 304) may be effectuated by a LF encoder, e.g., encoder 1010 of the system 1000 of FIG. 10A, encoder 1024 of the system 1020 of FIG. 10B.

In some implementations, operations in FIG. 3A may be effectuated using a given encoder component, e.g., encoder 1010 of FIG. 10A. The encoder 1010 may receive the high resolution input and output two bitstreams 1006, 1004 in FIG. 10A, corresponding to low-fidelity (LF) image and high fidelity (HF) image, respectively.

In some implementations, term fidelity may be used to characterize image quality. Image quality may be characterized by encoded bitstream resolution, bit-depth, bitrate, a combination thereof, and/or other parameters. The encoder 306 may be tailored to encode lower fidelity input more efficiently. The lower fidelity input may include a softened version of the input 302, reduced bit-depth version of the input 302, or the unaltered input 302. The encoder 306 may include a typical H.264, HEVC, and/or VP9 encoder functionality with IPPPP group of pictures (GOP) structure. B-frames in GOP may be used to increase compression performance. Encoder 306 may typically be operating at a lower bitrate compared to the bitrate of the input 302.

Encoder 316 may be configured to encode higher fidelity input more efficiently. The HF encoder may be configured to utilize some of the encoding results in 306 to optimize video quality and/or speed. The HF encoder may be operated using a GOP structure consisting of I-frames and P-frames (e.g., IPPPP) to reduce latency that may be associated with processing of B-frames. The HF encoder may be configured such that temporal prediction (from previous reference frames) is not allowed, so as to reduce and/or altogether remove latency when viewport changes. Since the HF encoder (e.g. 316) may be encoding higher resolution content compared to the content being encoded by the encoder 306, the encoder 316 may be operable to utilize larger block sizes, larger transform size (e.g., 2-4 times the standard transform size), and/or more advanced encoding tools tailored for high resolution image. By way of an illustration, LF encoder may utilize 4×4 transform; HF encoder may utilize 8×8 transform and quantization scaling matrix.

In some implementations, LF encoder codec may be configured different from the codec employed by the HF encoder. By way of a non-limiting illustration, LF encoder may be configured based on H.264 codec, while HF encoder may be configured based on HEVC codec.

In one or more implementations, lower resolution content portion (e.g., LF bitstream) may be encoded using more computationally intensive configuration (e.g., more detailed motion prediction). Output (e.g., motion vectors) of the LF encoding process may be reused and/or refined by the HF encoder in order to reduce energy use associated with obtaining HF bitstream of a given quality and/or obtain higher quality HF bitstream for given energy.

In some implementations, LF and HF bitstreams may be encoded using individually configured profiles of an encoder, e.g., LF bitstream may be encoded using H.264 baseline profile; HF bitstream may be encoded using one of higher profiles (e.g., high profile or high10 profile of H.264). Such implementations, may advantageously enable at least partial decoding of the encoded output bitstreams (e.g., 330, 332) by a decoder that may only support lower quality decoder profiles (e.g., decoder capable of decoding a baseline profile may decode the LF bitstream thereby providing some representation of the content). A decoder capable of decoding baseline and high profile may provide higher fidelity content by decoding of the LF and the HF bistreams, compared to a decoder capable of decoding only a single bitstream (LF or HF).

Individual bitstreams 330, 332 may be characterized by their respective nominal bitrate. For input image bit rate of X bps, HF output bitstream (330) bit rate may be configured at a fraction of X, the fraction selected between 0.1 and 0.9, such as 0.6 in one implementation. Lower fidelity (332) bit rate may be configured as a fraction of the HF output rate, the fraction selected between 0.1 and 0.5, e.g., 0.25 in one implementation. By way of a non-limiting illustration of providing 360-degree content, input 302 may include 8K images (7640 by 2160 pixels) provided at 30 fps for a bit rate of 30 megabits per second (Mbps); LF output may be include 3840 by 1080 images pixels at 30 fps for a bit rate of 10 mbps; HF output may include a viewport of 1920 by 1080 pixels at 30 fps for a bit rate of 2 mbps. By way of a non-limiting illustration of providing virtual reality (VR) stereo video content, input 302 may include pairs of 4K images 2×(3840 by 2160 pixels) provided at 30 fps for a bit rate of 30 megabits per second (Mbps); LF output may be include one or two full HD images (1920 by 1080 pixels) at 30 fps for a bit rate of 5 mbps (10 mbps for two images); HF output may be include a viewport of two 1920 by 1080 pixel images at 30 fps for a total bit rate of 1 mbps (1 mbps per image). FIG. 5B illustrates exemplary image configurations for input image 540, lower fidelity image 550, and higher fidelity image 542.

Processes 304, 306 of FIG. 3A may be effectuated by base layer component 908 of FIG. 9A described herein. Processes 310, 308, 318, 316 of FIG. 3A may be effectuated by enhancement layer component 910 of FIG. 9A described herein. Output bitstreams 330, 332 may be communicated to a target destination using any applicable methodology. In some implementations, e.g., user uploading panoramic content onto a web server, the content 302 may be encoded, the output bitstreams 332, 330 may be stored on the web server storage (e.g., 918 in FIG. 9A) for future delivery to a client device (e.g., 922 in FIG. 9A). In some implementations of encoding live content (e.g., during a video conference or live game streaming, content acquisition and broadcast by a content capture system 100 of FIG. 1A), the content 302 may be encoded and the output bitstreams 332, 330 may be delivered in real time to a client device using any applicable methodology (e.g., a broadcast, a single cast, a point-to-point transmission, a multicast, and/or other delivery method).

Figure 3B:
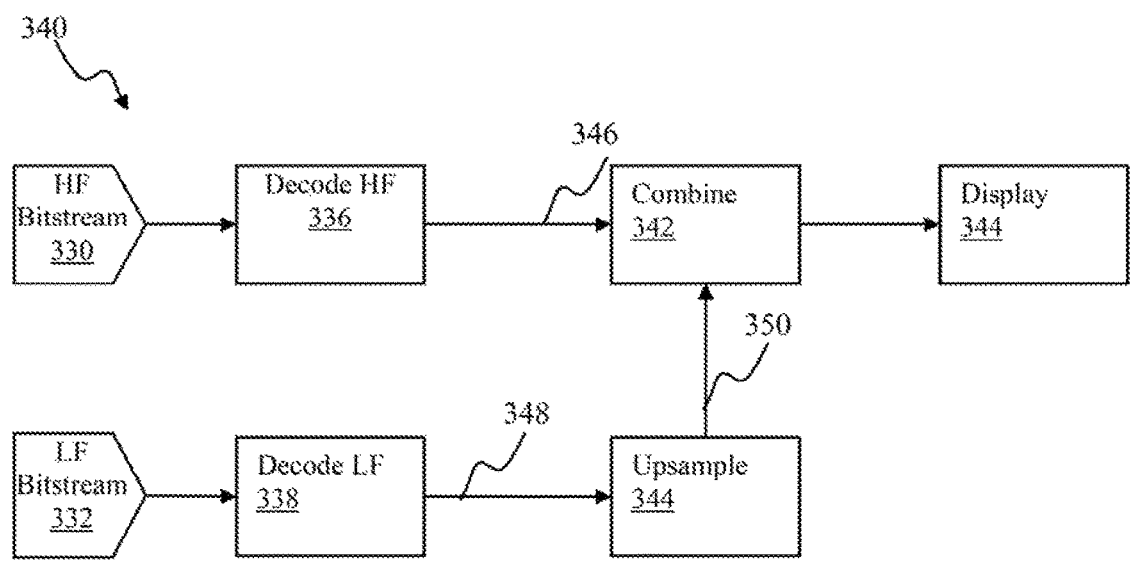

FIG. 3B illustrates spatial scalability decoder configuration, that may be employed on a client side when viewing panoramic content, e.g., such as provided by encoder configured in accordance with some implementations of FIG. 3A configuration.

Figure 9B:
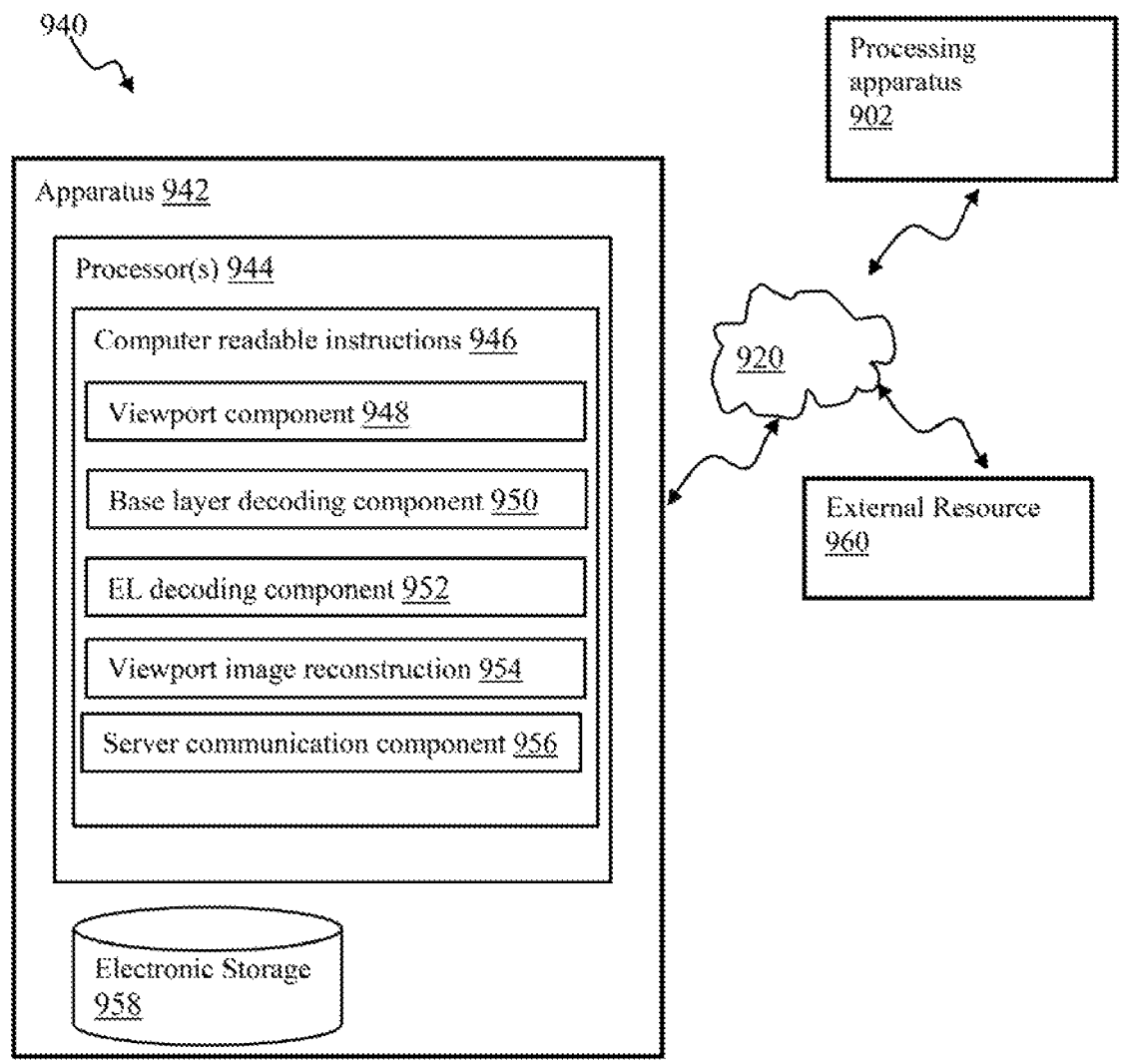
FIG. 9B is a functional block diagram illustrating a system for decoding content using scalable architecture of the disclosure, in accordance with one implementation.

Decoder configuration 340 shown in FIG. 3B may be implemented on a variety of devices, e.g., a remote device 120 of FIG. 1A, the headset 202 in FIG. 2, a client device 922 of FIG. 9A, system 940 of FIG. 9B, and/or other device configured to execute instructions and/or supporting decoding functionality using either hardware or software components.

Higher fidelity (HF) input bitstream 330 and lower fidelity (LF) input bitstream 332 may be received using any applicable methodology of delivering digital content (e.g., streaming over wireless data network). LF bitstream 332 may be decoded using LF decoder 338 to obtain lower resolution lower fidelity image output 348. LF decoder 338 may be configured compatible with the encoder 306 of FIG. 3A (e.g., supporting appropriate block dimensions, tile configuration, group of pictures (GOP) structure, and/or other configuration). In some implementations LF decoder 338 may be configured to implement functionality of decoder 308 of FIG. 3A. Decoded lower resolution lower fidelity image output 348 may be up-sampled by component 344 to obtain full resolution lower fidelity image output 350 (also referred to as the base layer). The decoder output 348 may also be directly used for displaying and/or rending output image to display device. Up-sampling component 344 may be configured in accordance with down-sampling parameters used during encoding (e.g., the down-sample factor of component 304 may be used as up-sampling factor by component 344).

HF bitstream 330 may be decoded using HF decoder 336 to obtain higher fidelity image output 346 (that also may be referred to as the reconstructed difference image). HF decoder 336 may be configured compatible with the HF encoder 316 of FIG. 3A (e.g., supporting appropriate block dimensions, tile configuration, group of pictures (GOP) structure, and/or other configuration).

In some implementations, the HF encoder 316 and/or HF decoder 336 may be configured to encode images using multiple blocks of pixels (referred to as minimum viewport block (MVB)). This may be the minimum size of the viewport window (212 in FIG. 2). The MVB may be a block of pixels that can be encoded (and decoded) independent of the blocks spatially or temporally adjacent to it. Pixels in MVB may be predicted from (i) collocated block of a low-fidelity image; (ii) other pixels inside the MVB, and/or when encoding multiple views e.g. stereo VR content encoding left and right eye images, difference image from co-located MVB for individual stereo image channels. In some implementations, the MVB may include a block of 256 by 64 pixels coded using tiles of HEVC encoder. In one or more implementations, the encoder 316 and/or HF decoder 336 may be configured to utilize 16×16 macroblocks encoded using Intra-BL mode in H.264-scalable video codec. Size of MVB may be adjusted in accordance with the input resolution and application constraints. Large MVB may increase the size of non-visible area, thereby contributing to non-essential bits and extra compute needed to decode it. A very small MVB may result in suboptimal compression performance for high-fidelity signal.

The base layer image 350 and the enhancement layer image 346 may be combined. In some implementations, the combiner process 342 may include pixel wise addition operation with truncation wherein value of a pixel at a given location in one image is combined (added) to value of a pixel at the corresponding location in another image. If the combined value exceeds pixel value range, the combined value may be set to the limit of the pixel value range (e.g., 255 for 8-bit pixel values).

In some implementations image frame of the HF input bitstream 330 may correspond to a portion of the input frame (e.g. viewport 212 of the frame 210 in FIG. 2, 542 of frame 540 in FIG. 5B). The combination operation 342 may include up-sampling area 552 in FIG. 5B and then adding output to HF input 346 in FIG. 3B. Image 350 (or 550 in FIG. 5B) may be retained in memory of the content decoding and/or display process; as the viewport position and/or size changes, the content display process may retrieve the retained image and render a corresponding area in low-resolution image 550 while it waits for new HF input bitstream 330.

Combined image output may be displayed. In some implementations, display component 352 may correspond to a screen of a user interface device (e.g., 120 in FIG. 1A), a TV display, a personal computer, a VR headset, and/or other display component. In one or more implementations, combined image may be stored for subsequent streaming and/or viewing.

In some implementations, e.g., such as illustrated in FIG. 2 and/or FIG. 5B, a window (viewport) into panoramic content provided by a content server may be characterized by a rectangular shape (e.g., window 542, 552). Various other viewport window shapes are contemplated, e.g., trapezoidal, curved, and/or other shapes (e.g., non-rectangular window). In one implementation of encoding content obtained with a camera characterized by a fish eye lens pattern, window may be configured in accordance with the fisheye to equirectangular transformation operation, e.g., such as area denoted 526 described FIG. 5 of U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, the foregoing being incorporated herein by reference in its entirety.

At decoder, pixels for a non-rectangular viewport may undergo a transformation to spherical coordinates for proper rendering and presentation.

In some implementations of, e.g., live video streaming to a single client, a portion of the difference image that the viewer may be watching may be encoded by the encoder 316. If multiple users may be viewing the content or if the difference image 328 was pre-encoded, the following approaches may be utilized.

If the difference image has been already encoded (e.g., for user 1) the encoder may, in one implementation, decode the viewport area and re-encode the viewport pixels in slices or tiles. In some implementations, the encoder may utilize coefficients from original bitstream and re-apply entropy encoding to the blocks in viewport area, package these blocks in slices or tiles in order to obtain encoded output bitstream 330.

In some implementations, a codec such as, e.g., VP9 and/or HEVC may be used to effectuate the above encoding functionality. A tile may be an independently decodable blocks of minimum size of, e.g., 256×64. Block size of 256 by 64 pixels may provide a better compression performance compared to smaller blocks (e.g., 16 by 16 pixels). The difference image 540 may be encoded using tiles of 256×64 size. As the viewport position and/or dimensions change, an encoding system (e.g., 900 in FIG. 9A) may select tiles corresponding to the updated viewport from an encoded bitstream (using encoder 316) and provide selected tiles to client.

Encoding methodology of the disclosure may be employed in the following exemplary scenario. A user may upload a video onto a server. Entire low fidelity and high fidelity frames of the video may be encoded by the server and may be stored. In response to a request to watch a viewport, the server may provide previously encoded LF bitstream and HF tiles from HF bitstream corresponding to the viewport area. Such configuration may enable content delivery to multiple users without necessitating re-encoding.

In some implementations of a videoconferencing system a user A and a user B may be engaged in a video call. Since there are only two participants watching each other, the server may not need to encode the entire diff image. Only portions of the diff images corresponding to viewports requested by individual users may be encoded.

In a multiparty video conferencing system (e.g., where 10 people are on a call with one another), the server may be configured to encode the entire high fidelity frame. Because multiple users may be looking at their own viewports, the server may encode entire video and serve content for individual users for their own viewport window. If during the teleconference number of users drops (e.g., to two), the full HF frame encoding may be configured to transition to partial HF frame encoding in order to save computations.

As shown in FIG. 3A, output of encoding process when processing video and or images is configured to provide one base layer image (low fidelity output bitstream 332) and one enhancement layer image (high fidelity output bitstream 330) for a given input image 302. This implementation may be utilized with panoramic image input (e.g., 302 input).

Figure 3C:
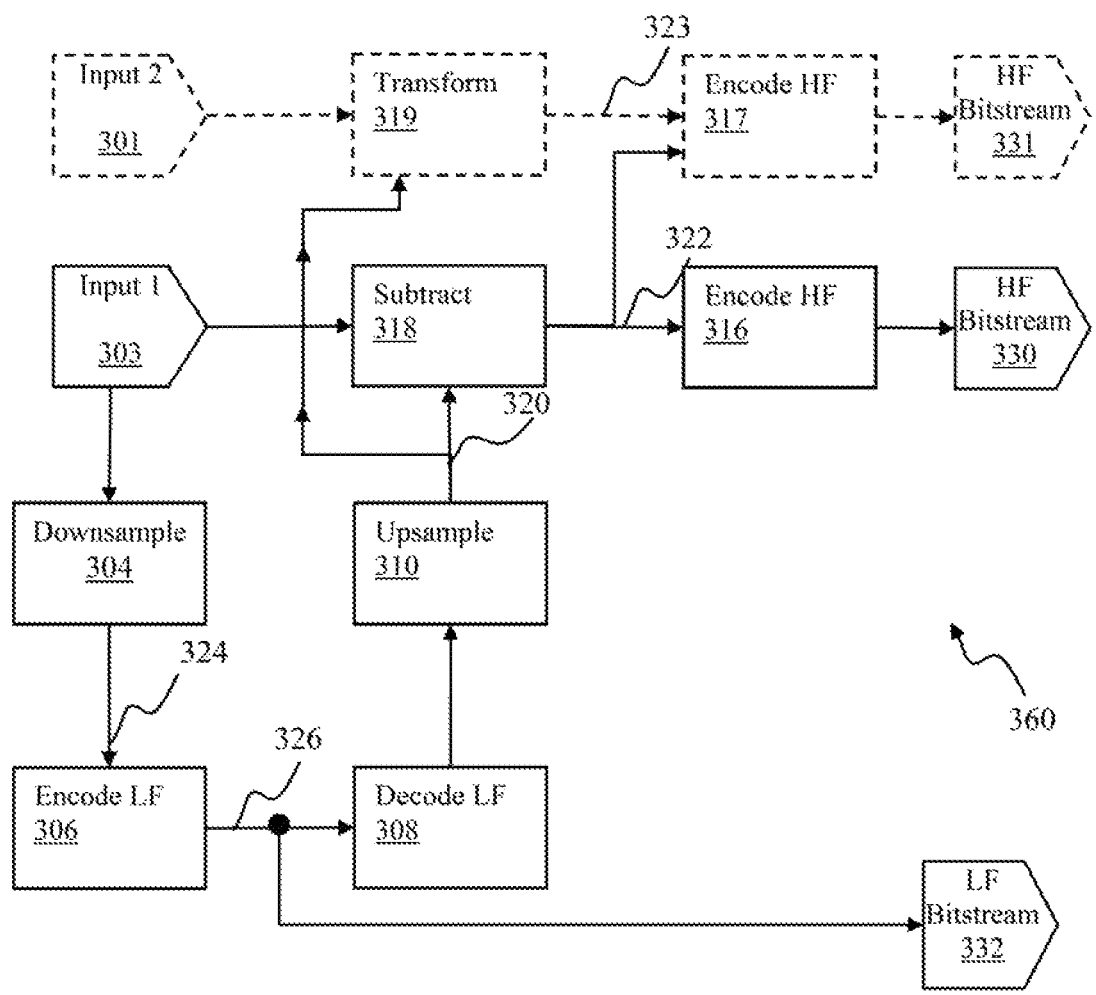
FIG. 3C is functional block diagram illustrating spatial scalability encoder configured to provide single LF bitstream and multiple HF bitstreams and usable for providing viewable stereo imaging content, in accordance with one or more implementations
Figure 3D:
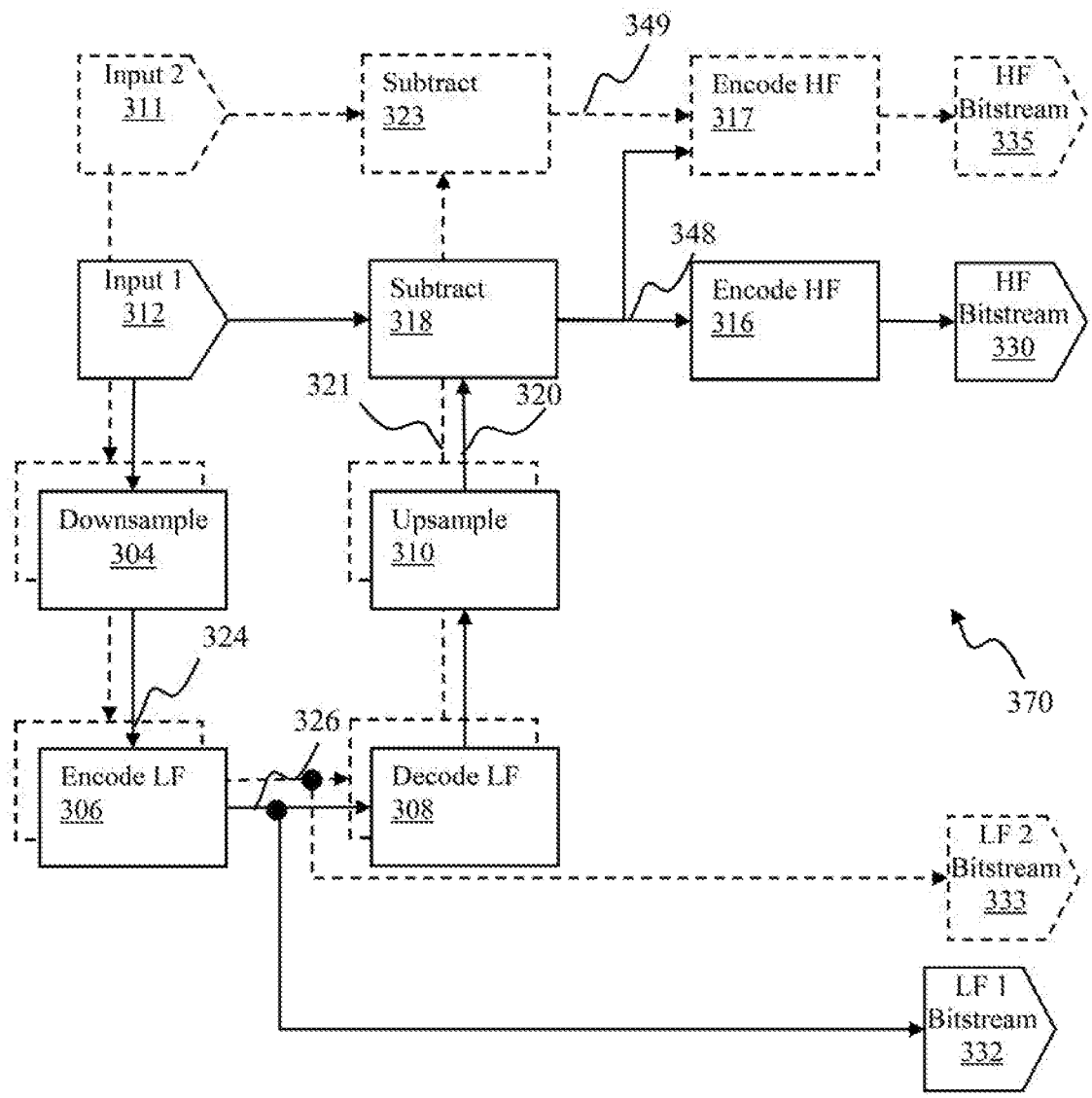
FIG. 3D is functional block diagram illustrating spatial scalability encoder configured to provide multiple LF and HF bitstreams and usable for providing viewable stereo imaging content, in accordance with one or more implementations.

Encoding methodology of the present disclosure may be employed when encoding virtual reality content consisting of stereo image pairs obtained with spatially spaced cameras. FIGS. 3C-3D illustrate spatial scalability encoder configurations, usable for providing viewable stereo imaging content, in accordance with one or more implementations. In some implementations of stereo imaging content capture, pairs of images may be captured with two cameras that are slightly offset from one another. The individual images may be referred to as the "right" image and "left" image.

When encoding VR content, the input may include pairs of images such as e.g., input 1 (303) and input 2 (301) in FIG. 3C. For a wide field of view image capture (e.g., greater than 60° in some implementations), left and right images may have high similarity for regions where objects are distant from the camera. Stereoscopic or Multiview encoders 360, 370 of FIG. 3C-3D may be configured to utilize similarity between images within a given pair of stereo images. In implementations where the individual cameras of a stereo pair are displaced from one another by a distance of about fifty (50) millimeters (mm) during capture, objects farther than about five (5) meters (m) from the individual cameras may appear similar (e.g., in appearance and/or position) within camera images. Objects disposed closer than that distance may appear different in shape and/or position between the and left/right cameras due to parallax effects. It will be recognized by those skilled in the arts that these values are exemplary and object representation displacement in images due to parallax may occur based on object dimensions, camera FOV, and/or camera spacing.

The system 360 of FIG. 3C may include an encoder component 317 configured to obtain HF output bitstream 2 331. In some implementations, the output bitstream 2 331 may be obtained based on encoding the transformed input 2 (323) and difference image 322 obtained by the subtraction component 318. In some implementations, the LF output bitstream 332 may provide lower fidelity panoramic image content, HF output may provide higher fidelity image for a viewport into the panoramic image content, and HF output bitstream 2 (331) may provide higher fidelity difference image into the viewport relative the HF output bitstream 330. In some implementations, the HF output bitstream 330 may be characterized by greater bitrate compared to the output bitstream 331. Input 322 into encoder 316, 317 in FIG. 3C may contain less energy at lower frequencies (large special scales) and more energy as higher frequencies (small spatial scales) compared to the input 302.

In some implementations, input 301, 303 may correspond to two stereoscopic images, one per eye. In one or more implementation, the difference images obtained from left and right camera source images may be encoded separately using encoder configuration of FIG. 3A.

In some implementations, difference image for one camera (one eye) may be configured (predicted) based on difference image for another camera as shown and described with respect to FIGS. 3C-3F.

Encoder 360 may be configured to encode imaging input including pairs of images 303, 301. Input 301 may correspond to left portion of stereo image; input 303 may correspond to a right portion of the stereo image.

Given a given degree of similarity between left/right images of stereo content, encoded stereo output may include one LF output bitstream (e.g., 332 in FIG. 3C) and two HF output bitstreams 330, 331 in FIG. 3C. One of the channels (e.g., right image input 303 in FIG. 3C) may be encoded using methodology described with respect to FIG. 3A to obtain LF output 332 and HF output bitstream 330.

Information from encoding one channel of stereo imaging input (e.g., right image input 303 in FIG. 3C) may be utilized to improve efficiency when encoding HF version of the other channel (e.g., left image input 301 in FIG. 3C), as compared to encoding left/right channels independently from one another.

Input 301 may be encoded to obtain the second HF output bitstream 331 as follows. Up-sampled LF output 320 image may be combined with input 301 (via the transform 319) to obtain output 323. In FIG. 3C, the transform component 319 may be configured to effectuate a subtraction and/or transform operation (e.g., such as performed by the component 318 of FIG. 3A).

In other variants, the transformation operation 319 may include translation, rotation, scaling, warping, and/or other operations applied to input 301 and/or 320. When encoding VR content, the component 319 may effectuate a translation operation (e.g. a shift) to the up-sampled base layer pixels before subtracting input pixels. The translation operation may be configured to match perspective of left/right views and improve alignment between the input 2 (301 in FIG. 3C) and the up-sampled version of input 1 (320 in FIG. 3C). The transformation operation 319 may include subtraction of the aligned image 320 from input 301 to obtain a residual left channel image 323. The residual image 323 may be encoded by encoder 317 to obtain a HF output bitstream 2 331.

The encoder 317 may be provided with the residual image version 322 for the other stereo channel. The encoder 317 may utilize similarities between inputs 323, 322 to improve encoding efficiency of output bitstream 2 331. In some implementations, the improved efficiency may be characterized by one or more of reduced computations, increased quality, reduced energy use. In some implementations, the operation of HF encoders 316, 317 may be configured as a part of a stereoscopic and/or Multiview encoding process that may be automatically configured to detect parallax in the input 322 (also referred to as the "base view") ant input 323 (also referred to as the "dependent view"). Based on detecting an amount of parallax (e.g., based on displacement of one or more objects in the images) the Multiview encoding process may adaptively select appropriate inputs (e.g., 322 and/or 323 for encoding in order to obtain output bitstreams 330, 331. By way of an illustration, when encoding objects distant from the camera (e.g., five (5) meters (m) or more for fifty (50) millimeter (mm) camera separations) the Multiview encoder may encode the base view 322 to obtain output bitstream 330; for close objects, the encoder may encode both the base view 322 and the dependent view 323 to obtain output bitstreams 330, 331. In some implementations, an encoder may adaptively switch from one input to another input, or to both inputs, during encoding.

FIG. 3D illustrates an encoder configuration 370 for encoding stereo input to obtain two (2) LF output bitstreams 332, 333 and two (2) HF output bitstreams 335, 330. Encoder configuration 370 of FIG. 3D may be utilized for encoding stereo input 312, 311 that may be characterized by a lower degree of similarity compared to input 301, 303 described with respect to FIG. 3C. Configuration of FIG. 3D may be utilized when objects within left/right images are displaced substantially (e.g., 25% of object width) between left/right images due to parallax caused by larger camera spacing and/or close object proximity to the cameras. In FIG. 3D, input 311, 312 may be obtained, e.g., using cameras that may be spaced more distant compared to cameras used to obtain input 301, 303 and/or cameras characterized by less overlapping FOV compared to cameras used to obtain input 301, 303. In FIG. 3D, input 311 may correspond to a left portion of the stereo image; input 312 may correspond to a right portion of the stereo image.

In FIG. 3D, one of the channels (e.g., channel 1) may be encoded using methodology described with respect to FIG. 3A to obtain LF output bitstream 332 and HF output bitstream 330. Another channel (e.g., input 311 of channel 2) may be encoded to obtain the second LF output bitstream 333 using down-sample-encode methodology described with respect to FIG. 3A. In FIG. 3D, broken lines denote manipulation operations applied to input 311.

Input 311 may be encoded to obtain a second HF output bitstream 335 as follows. Up-sampled LF output 321 for channel 2 may be combined with the input 311 to obtain output 349. In some implementations, the combination may include subtraction operation implemented by component 323. The residual image 349 may be encoded by encoder 317 to obtain HF output bitstream 2 335. The encoder 317 may be provided with the residual image version 348 for channel 1. The encoder 317 may utilize similarities between inputs 348 and 349 to improve encoding efficiency of output bitstream 335. In some implementations, the improved efficiency may be characterized by one or more of reduced computations, increased quality, reduced energy use. In some implementations, operation of encoders 316, 317 may be configured as a part of a stereoscopic and/or Multiview encoding process that may be automatically configured to detect parallax in the input 348 (the base view) ant input 349 (the dependent view). Based on detecting an amount of parallax (e.g., based on displacement of one or more objects in the images) the Multiview encoding process may adaptively select an appropriate input (e.g., 348 and/or 349) for encoding in order to obtain output bitstreams 330, 335. By way of an illustration, when encoding objects distant from the camera (e.g., five (5) meters (m) or more for fifty (50) millimeter (mm) camera separations) the Multiview encoder may encode base view 348 to obtain output bitstream 330; for close objects the encoder may encode both the base view 348 and the dependent view 349 to obtain output bitstreams 330, 335. In some implementations, an encoder may adaptively switch from one input to another input, or to both inputs, during encoding.

Information from encoding one channel of stereo imaging input (e.g., channel 1 input 312 in FIG. 3D) may be utilized to improve efficiency when encoding HF version of the other channel (e.g., left input 311 in FIG. 3D), as compared to encoding left/right channels independently from one another.

Figure 3E:
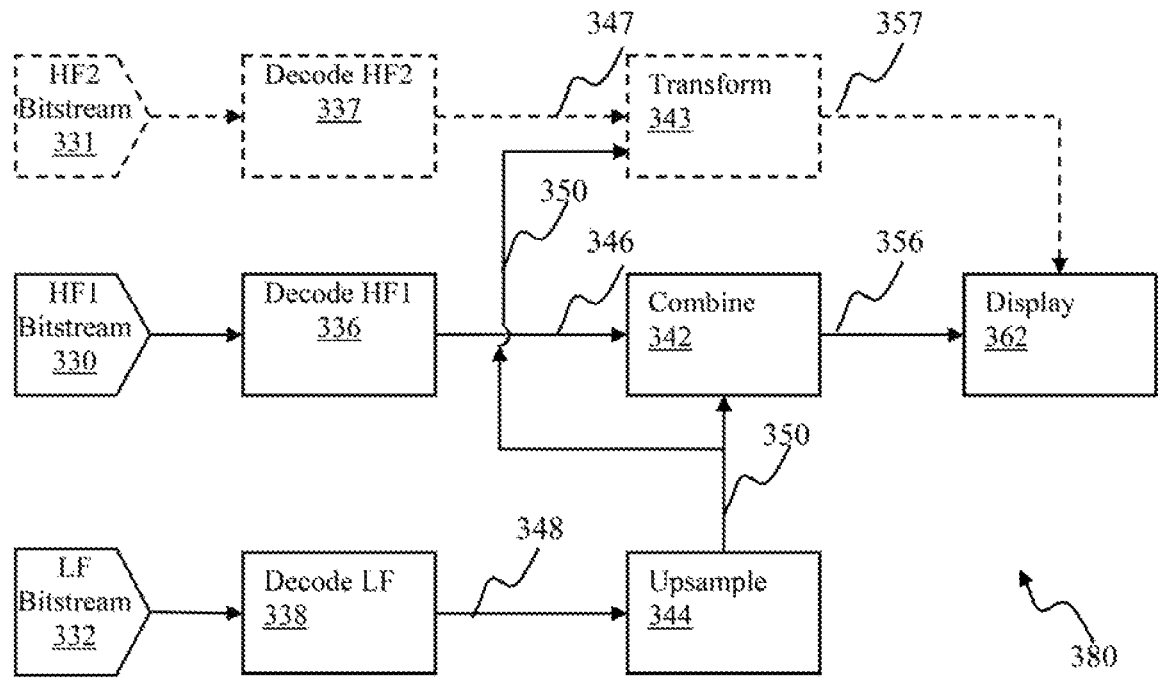
FIG. 3E is functional block diagram illustrating spatial scalability decoder configured to decoding single LF bitstream and multiple HF bitstreams and usable for enabling viewing of stereo imaging content, in accordance with one or more implementations
Figure 3F:
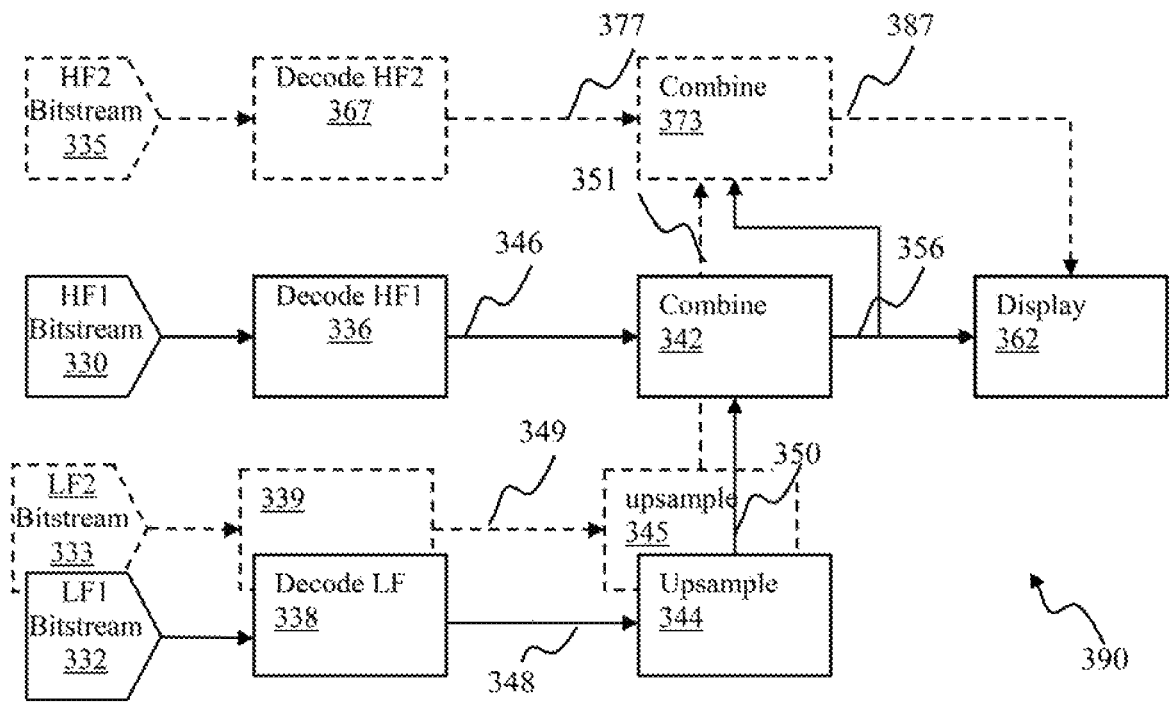
FIG. 3F is functional block diagram illustrating spatial scalability decoder configured to decode multiple LF and HF bitstreams and usable for enable viewing of stereo imaging content, in accordance with one or more implementations.

FIGS. 3E-3F illustrate spatial scalability decoder configurations, usable for viewing stereo imaging content, in accordance with one or more implementations. When decoding VR content (that may include two image channels, e.g., left/right), the input may include two HF bitstreams 330, 331 and the LF bitstream 332 (in FIG. 3E). As shown in FIG. 3E, the decoder configuration 380 may include decoder component 338 configured to decode LF input bitstream 332; decoder components 336, 337 may be configured to decode HF input bitstreams 330, 331, respectively. Lower fidelity bitstreams may provide lower fidelity image information for left and right stereo image components. Higher fidelity bitstreams may provide higher fidelity information (e.g., an enhancement layer) for respective channels (e.g., left or right). In some implementations, the higher fidelity bitstreams may provide information for a viewport into a panoramic image.

Decoder 338 output 348 may be up-sampled to obtain full resolution lower fidelity image output 350 (also referred to as the base layer). The base layer image output 350 may be combined with the decoded HF input HF1 346 to obtain a reconstructed viewport image 356 for one of the stereo channels (e.g., channel 1). Decoder 337 may provide decoded HF2 output 347. The operation of decoders 336, 337 may be configured in accordance with the operation of encoder 316, 317. By way of an illustration, when encoders 316, 317 utilize an HEVC codec with given tiles, slices, coding units, quality profiles, de-blocking filters and/or other configurations, the decoders 336, 337, respectively, may be configured with the appropriate corresponding parameters suitable for the HEVC decoding process.

Decoded output 347 may be combined with the base layer image 350 by transform component 343. Transform component 343 may be configured to effectuate a combining operation (e.g., addition) such as performed by the component 342 of FIG. 3B. In some implementations of encoding VR content, the transform component 343 may be configured to translate pixels of one of the decoded image channel (e.g., 347) relative to the pixels of the other decoded image channel (e.g., 350). The translation operation may precede the combining operation. The translation operation may be configured to match perspectives of left/right views and improve alignment between left/right image channels. Output 357 may provide a reconstructed viewport image for another stereo channel (e.g., channel 1). The resulting reconstructed images 356, 357 may be viewed on a display device (e.g., a VR headset 202 in FIG. 2).

FIG. 3F illustrates a spatial scalability decoder configuration 390 for viewing stereo imaging content encoded by e.g., the encoder system 370 of FIG. 3D. When decoding VR content (that may include two (2) image channels e.g., left/right), input into the decoder 390 may include two (2) HF bitstreams 330, 335 in FIG. 3E and two (2) LF bitstreams 332, 333.

Decoder configuration 390 may include decoder components 338, 339 configured to decode LF input bitstreams 332, 333, respectively; and decoder components 336, 367 configured to decode HF input bitstreams 330, 335, respectively. Lower fidelity bitstreams 332, 333 may provide lower fidelity image information channel 1 and channel 2, respectively, of the stereo image. Higher fidelity bitstreams may provide higher fidelity information (an enhancement layer) for respective channel (e.g., left or right). In some implementations, the higher fidelity bitstreams may provide information for a viewport into a panoramic stereo image.

Outputs 348, 349 of decoders 338, 339, respectively, may be up-sampled to obtain full resolution lower fidelity image output 350, 351 (also referred to as the base layer) for a respective channel. Decoders 348, 349 may be configured in accordance with configuration of encoders used to obtain encoded bitstreams 332, 333 e.g., from encoders 306 in FIG. 3D. By way of an illustration, when encoders 306 utilize an HEVC codec with a given slice, macroblock, quality profile, de-blocking filter and/or other configuration, the decoders 338, 339, respectively, may be configured with corresponding appropriate parameters for the HEVC decoding process. Similarly, decoders 336, 367 may be configured in accordance with configuration of encoders used to obtain encoded bitstreams 330, 331 e.g., encoders 316, 317 in FIG. 3D.

Outputs 346, 377 of decoders 336, 367, respectively, may be combined with the respective up-sampled base layer images 350, 351 to obtain reconstructed stereo image channels 356, 387. The combiner component 373 may be configured to combine residual image 377 and up-sampled base layer image 351 e.g., via a pixel level addition operation such as performed by the component 342 of FIG. 3B. In some implementations of encoding VR content, the component 373 may be configured to selectively combine up-sampled base layer image 351, residual image 377 for a given channel (e.g., image 377 for channel 2) and residual image for another channel (e.g., image 356 for channel 1) to obtain reconstructed image 387 for the given channel (e.g., channel 2). In one such embodiment, selective combination may include evaluating the pixel values of inputs 356, 377, determining a location of various pixels within inputs 356, 377, and/or other operations. By way of illustration, when viewing an image of a distant object (from the capture device), the object representations in left/right stereo image portions may be substantially similar to one another. Thus, component 373 may detect a degree of similarity (e.g., based on values of pixels of output 377 being within a given range (e.g., below a given value and zero); component 373 may then obtain output 387 by copying input 356 from the other channel. In some implementations, the image output for the second stereo channel (e.g., the output 387) may be configured based on a sum of the LF reconstructed image for that channel (351) and the HF image for that channel (377); a sum of the LF reconstructed image for that channel (351), the HF image for the other (first) channel (346), and the HF image for that channel (377); or as a copy of the first channel output (356). The reconstructed images 356, 387 may be viewed on a display device (e.g., VR headset 202 in FIG. 2).

Figure 4A:
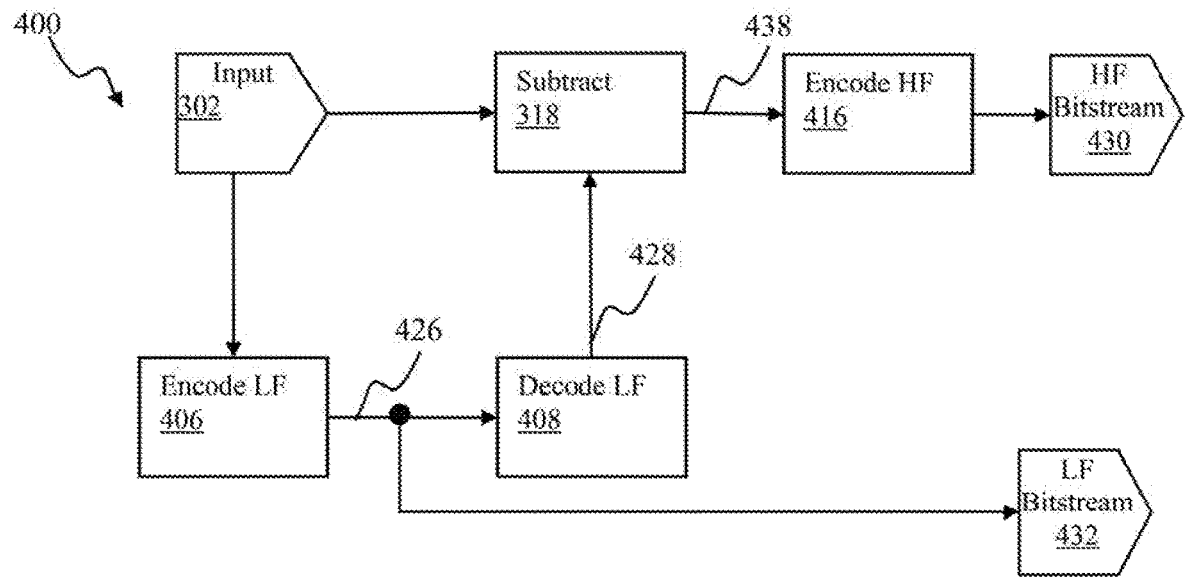
FIGS. 4A-4B are functional block diagrams illustrating a quality scalability encoder/decoder, respectively, each of which may be used for providing viewable panoramic content, in accordance with one implementation.
Figure 4B:
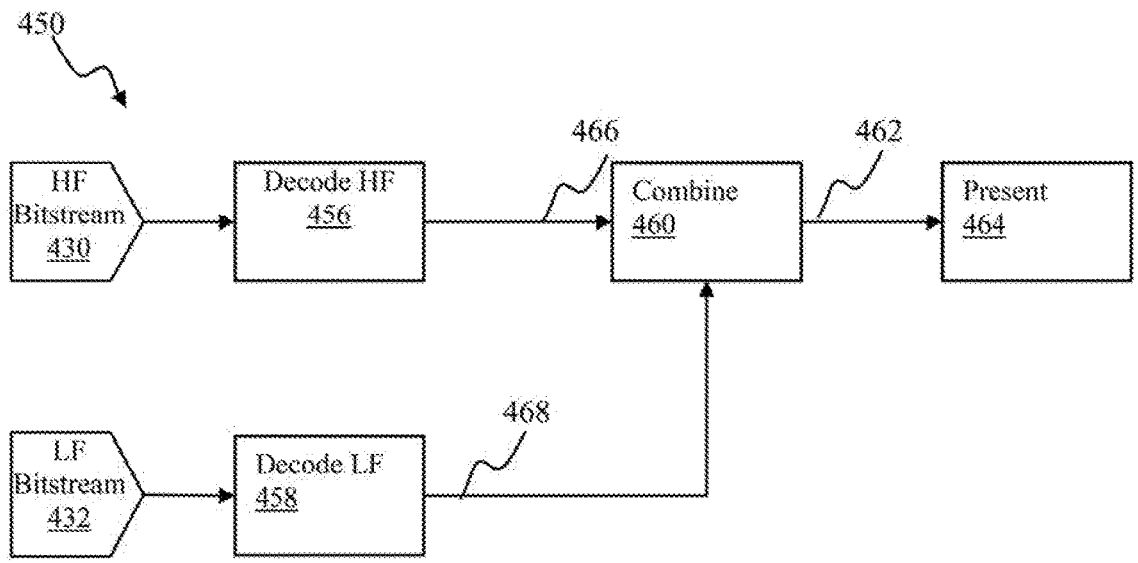

FIGS. 4A-4B illustrate an encoder and decoder system for scalable quality, that may be used for providing viewable panoramic content, in accordance with various implementations. The encoder system 400 of FIG. 4A may be configured to transform panoramic imaging input 302 into two (or more) encoded output bitstreams. The input 302 may be encoded using a lower fidelity encoder 406 to obtain a lower fidelity bitstream 426. In FIG. 4A, the encoded bitstream 426 may be decoded by component 408 to obtain a reconstructed LF output 428. The decoder 408 may be configured to be compatible with the encoder 406 e.g., using HEVC codec, and/or other codec. The reconstructed LF output 428 may be combined with the input 302. In some implementations of image encoding, the reconstructed LF image may be subtracted from the input image by a component 318 to obtain a residual image. Residual output 438 may be encoded using a higher fidelity encoder 416. The HF encoder 416 may be configured to produce output bitstream 430 characterized by higher quality compared to encoding operation of encoder LF. In some implementations, operation of components 406, 416 may be based on a quality of encoding.

In some embodiments, the quality of encoding (also referred to as Quality of Service (QoS)), may be adapted by modifying an image bit depth, resolution and/or encoded output bitrate. The encoded bitrate may be modified for a given image resolution, thereby enabling an encoder with scalable quality capabilities, also referred to herein as a "quality scalability encoder". In one "spatial scalability encoder" variant, an image resolution (or other spatial parameter) is modified for a given bitrate; still other "spatio-quality scalability encoder" variants may modify image resolution and bitrate contemporaneous with one another. In some implementations, a bit depth of an image pixel (e.g., 8 bit, 10 bit, 12 bit, 16 bit or other number of bits) may be modified by a scalability parameter in order to obtain lower fidelity (fewer bits per pixel) output, and/or higher fidelity output (more bits per pixel). As used herein, the term "quality scalability" may refer to an encoder configured to produce two or more bitstreams of different bitrates, wherein the bitrates are controlled by the quality of encoding. As used herein, the term "resolution scalability" may refer to an encoder configured to produce two or more bitstreams of different bitrates, wherein the bitrates are controlled by the resolution of encoded image. As used herein, the term "spatial scalability" may refer to an encoder configured to produce bitstream images of different sizes and/or spatial extents, wherein the bitrates are controlled by the image size/spatial extent. It will be recognized by those skilled in the arts that other encoder configurations may be utilized including a combination of two or more of quality, resolution, and spatial scalability encoders.

In some implementations of image encoding, output bitstream 432 may be referred to as the base layer and output bitstream 430 may be referred to as the enhancement layer. The LF output bitstream 432 and the HF output bitstream 430 may be provided to a target destination. In one or more implementations, the target destination may include a content depository, a user interface device, and/or other destinations that are configured to store and/or present content. In some implementations of encoding imaging content, the HF output bitstream 430 may characterize a portion of the image (e.g., viewport 212 in FIG. 2) and the output bitstream 432 may characterize the whole panoramic image (e.g., 210 in FIG. 2).

Spatial scalability and quality scalability encoding approaches may be used to achieve different QoS for video delivery. Spatial scalability encoding can be used to create different resolutions at different rates, whereas quality scalability encoding can be used to create the same resolution at different rates. Various factors may be used to decide when to use spatial scalability and when to use quality scalability. For example, in one such scenario, the decision may depend on bitrate ratios between low-resolution and high-resolution video. In this example, spatial scalability encoding provides a higher bitrate ratio, and is better suited to situations where there is a larger difference between high and low resolutions. Thus, if the high-resolution is encoding at a first rate and low-resolution is encoding at a quarter rate (25%), then the more aggressive spatial scalability encoding may be used. In contrast, if the high-resolution is at a first rate and low-resolution is at three-quarters (75%) of the first rate, then less aggressive quality scalability encoding may be used.

FIG. 4B illustrates a quality scalability decoder configuration, that may be employed on a client side when viewing panoramic content e.g., such as provided by a quality scalability encoder configured in accordance with FIG. 4A.

As shown, the decoder configuration 450 shown in FIG. 4B may be implemented on a variety of devices e.g., remote device 120 of FIG. 1A, VR headset 202 in FIG. 2, a client device 922 of FIG. 9A and/or other device configured to execute instructions and/or supporting decoding functionality using either hardware or software components.

The higher fidelity (HF) input bitstream 430 and lower fidelity (LF) input bitstream 432 may be obtained using any applicable methodology of delivering digital content (e.g., streaming over wireless data network). The LF bitstream 432 may be decoded using a LF decoder 458 to obtain lower quality/lower fidelity image output 468. LF decoder 458 may be configured compatible with (or complementary to) the encoder 406 of FIG. 4A (e.g., supporting appropriate block dimensions, tile configuration, group of pictures (GOP) structure, and/or other configurations). In some implementations LF decoder 458 may be configured to implement functionality of decoder 408 of FIG. 4A.

In FIG. 4B, HF bitstream 430 may be decoded using HF decoder 456 to obtain higher fidelity image output 446 (that also may be referred to as the reconstructed difference image). HF decoder 456 may be configured compatible with (or complementary to) the HF encoder 416 of FIG. 4A (e.g., supporting appropriate block dimensions, tile configuration, group of pictures (GOP) structure, and/or other configurations).

In some implementations, the HF encoder 416 may be configured to encode images using multiple blocks of pixels (referred to as a minimum viewport block (MVB)). The MVB may be the minimum size of the viewport window (e.g., 212 in FIG. 2). The MVB may be a block of pixels that can be encoded (and decoded) independent of the blocks spatially or temporally adjacent to it. The pixels in the MVB may be predicted from (i) a collocated block of a low-fidelity image; (ii) other pixels inside the MVB, and/or (iii) a difference image from a co-located MVB for individual stereo image channels when encoding multiple views e.g. stereo VR content encoding left and right eye images. In some implementations, the MVB may include a block of 256 by 64 pixels coded using tiles of a HEVC encoder. In one or more implementations, the encoder 416 may be configured to utilize 16×16 macroblocks to encode HF bitstream 430 using an intra-mode in H.264-scalable video codec. The size of the MVB may be adjusted in accordance with the input resolution and application constraints. Larger MVBs may increase the size of non-visible area; this increases the compute resources that are needed to decode the non-visible area (which are non-essential bits). In contrast, too small of a MVB can result in suboptimal compression performance for high-fidelity signals (e.g., viewport movement will constantly update the MVB).

The decoded low fidelity (base layer) image 468 and the decoded high fidelity (enhancement layer) image 466 may be combined. In some implementations, the combiner process 460 may include pixel wise addition operation with truncation where a value of a pixel at a given location in one image is combined (added) to value of a pixel at the corresponding location in another image. If the combined value exceeds the pixel value range, then the combined value may be set to the limit of the pixel value range (e.g., 255 for 8-bit pixel values).

In some implementations, the HF input bitstream 430 may correspond to a portion of the input frame (e.g. viewport 212 of the frame 210 in FIG. 2, 542 of frame 540 in FIG. 5B). The combination operation 460 may include up-sampling an area 552 in FIG. 5B and then adding the up-sampled output to the HF input 466. Image 550 may be retained in memory of the content decoding and/or display process; as the viewport position and/or size changes, the content display process may retrieve the retained image and render a corresponding area in low-resolution image 550 while it waits for new HF input bitstream 430.

A combined output 462 may be presented for viewing. In one or more implementations, presentation 464 may include displaying a viewport 212 into panoramic image via a VR headset (e.g., 200 in FIG. 2), and/or user interface device 120 of FIG. 1A.

Figure 5A:
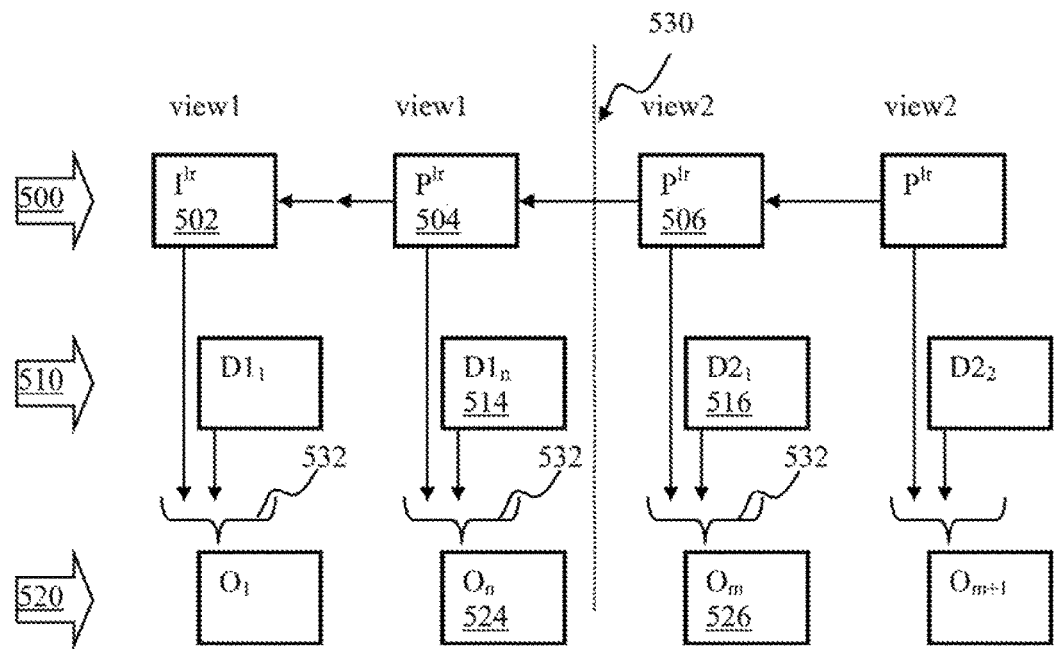
FIG. 5A is a block diagram illustrating a group of frames configuration of the disclosed spatial scalability encoder, in accordance with one implementation.
Figure 5B:
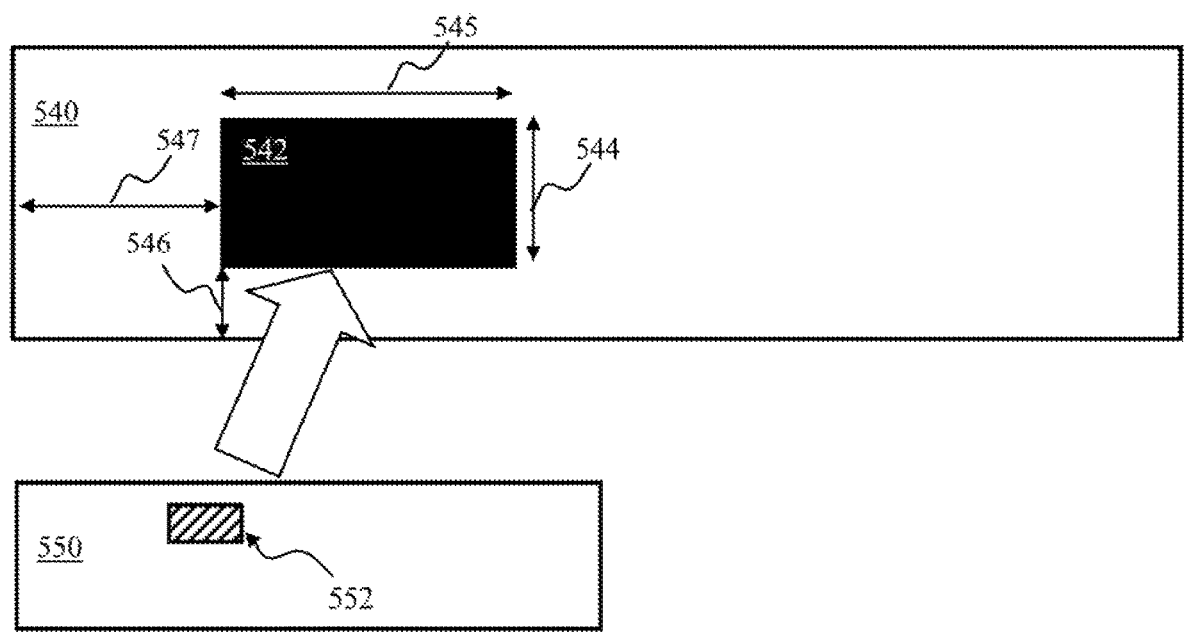
FIG. 5B is a block diagram illustrating frame configurations of a lower fidelity bitstream, higher fidelity bitstream, and viewport, in accordance with one implementation.

FIG. 5A is a block diagram illustrating group of frames (GOP) configuration of the spatial scalability encoder of the disclosure, in accordance with one implementation. Stream denoted 500 corresponds to a GOP of a video segment (e.g., input 302 in FIG. 3A) that may be provided to a viewing device. The GOP 500 may include one or more I-frames (e.g., 502) and one or more P-frames 504, 506. In some implementations wherein higher compression rate may be desired and/or greater latency may be tolerated, the GOP may include one or more B-frames. Individual frames 502, 504, and 506 may correspond to frame 540 described with respect to FIG. 5B. The P frame 504 may be encoded using information from the I-frame 502. The P frame 506 may be encoded using information (motion prediction) from the I-frame 502 and/or P-frame 504.

As illustrated in FIG. 5A, the I-frame 502 and P frame 504 correspond to one view (e.g., view 1 corresponding to one position of the viewport (e.g., 212 in FIG. 2)), whereas P-frame 506 corresponds to another view (e.g., view 2 corresponding to another viewport position (e.g., 222 in FIG. 2)). Still other arrangements may be substituted with equivalent success by those of ordinary skill in the related arts given the contents of the present disclosure; for example, any number of frames may correspond to any number of views. Similarly, any arrangement of I frames (independent frames), P frames (forward predictive frames), and/or B frames (bi-directionally predictive frames) may be used, the foregoing discussion being purely illustrative.

FIG. 5B illustrates another exemplary image configuration for use with the scalable encoding methodology of the disclosure. The input image 540 may be encoded to obtain a low fidelity output image 550 (e.g., the output bitstream 332 in FIG. 3A). The content of input 540 may be provided to a user display device (e.g., 120 in FIG. 1A and/or 202 in FIG. 2). The provided content may include the LF image 550 and a portion of the image 540 encoded using HF encoding corresponding to the viewport (of the image 540) being displayed by the user device. The viewport location may correspond to a rectangular area 542 in FIG. 5B. The hashed rectangle 552 represents a location of the viewport in the low fidelity image 550. The location of the viewport may be modified e.g., due to user head motion and/or the user moving the display device 120. The low fidelity component of the content corresponding to the new viewport location may be obtained by the user device using an available version of the LF image (e.g., cached image 550). In some implementations, the HF portion of the content (e.g., output bitstream 330 in FIG. 3A) corresponding to the updated location may be encoded and/or communicated to the user device based on an indication of the viewport location change.

In one exemplary embodiment, the HF and LF content portions may be combined for display. The combination operation may include up-sampling area 552 in FIG. 5B and then adding the output to the HF input 346 in FIG. 3B. Image 550 may be retained in the memory of the content decoding and/or display process. As the viewport position and/or size changes, the content display process may retrieve the retained image and render a corresponding area in low-resolution image 550 while it waits for new HF input bitstream 330. It will be recognized by those skilled in the arts that although a rectangular viewport is shown in FIG. 5B, various other viewport shapes may be utilized, e.g., non-rectangular shapes (e.g., contoured rectangle, contoured trapezoid, and/or trapezoid) and/or other shapes.

Figure 6:
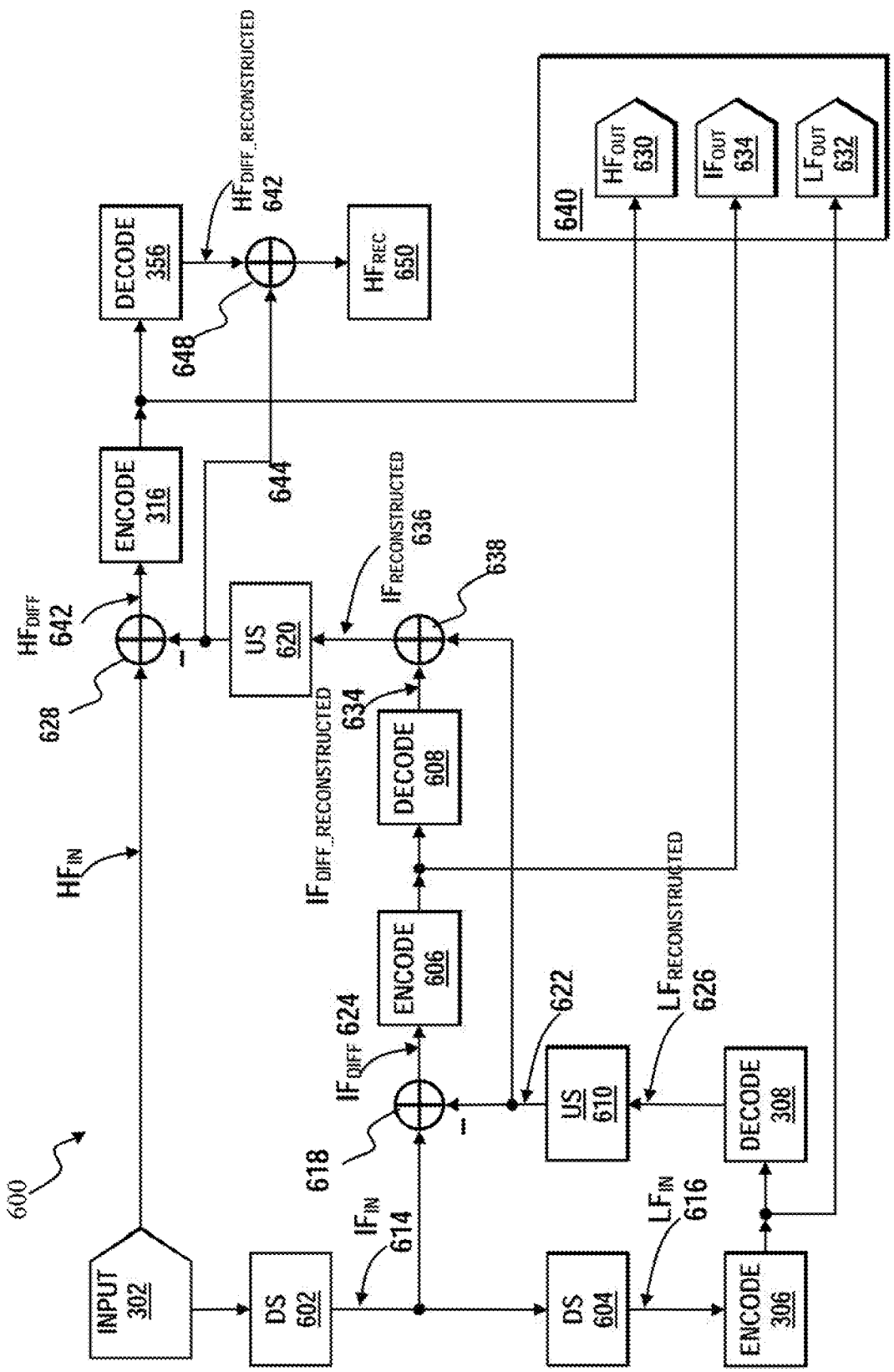
FIG. 6 is a block diagram illustrating three-layer scalability encoder configuration, in accordance with some implementations.

In some implementations, e.g., such as described with respect to FIG. 6, three or more scalability layers may be utilized. A multilayer scalability system may include a higher fidelity layer, a lower fidelity layer, and one or more intermediate layers. FIG. 6 illustrates an exemplary three-layer scalability system 600 configuration, in accordance with some implementations.

In FIG. 6, the three-layer scalability system 600 may include three (3) encoding layers configured to encode input 302 into an output bitstream 640 including a higher fidelity output component 630, one or more intermediate fidelity (IF) output components (e.g., 634 in FIG. 6), and a lower fidelity (LF) output component 632.

In FIG. 6, input 302 may be down-sampled by down-sampling component 602 to obtain $IF_{IN}$ image 614. In some implementations, the down-sampling component 602 may be operable in accordance with methodology described with respect to component 304 of FIG. 3A. The down-sampling applied by the component 604 may be selected between two (2) and sixteen (16) e.g., two (2) in some implementations. By way of an illustration, for a 7680×4320 pixel input 302, the down-sampled $LF_{IN}$ output 616 may be characterized by a full HD resolution of 3840 by 2160 pixels. Output 614 may be regarded as intermediate fidelity input and referred to as $IF_{IN}$.

In FIG. 6, $IF_{IN}$ input 614 may be down-sampled by down-sampling component 604 to obtain $LF_{IN}$ input 616. In some implementations, the down-sampling component 604 may be operable in accordance with methodology described with respect to component 304 of FIG. 3A. The down-sampling applied by the component 604 may be selected between one (1) and sixteen (16), e.g., 1.5 or 2 in some implementations. By way of an illustration, consider an image that has 1920 by 1080 pixels resolution of the intermediate image, the down-sampled $IF_{IN}$ image may be characterized by full HD resolution of 1280 by 720 pixels. The output 616 may be regarded as lower fidelity input and referred to as $LF_{IN}$.

Lower fidelity input $LF_{IN}$ 616 may be processed using methodology described with respect to input 324 of FIG. 3A, wherein input 616 may be encoded to obtain LF output bitstream 632. The encoded LF bitstream may be decoded by decoder 308 to obtain LF reconstructed output 626. LF reconstructed output 626 may be up-sampled by up-sampling component 610 to obtain output 622. The up-sampling configurations 610 (e.g., up-sampling factor) may be configured in accordance with the down-sampling configuration (604). The output 622 may be referred to as LF reconstructed output at IF layer resolution or IF reconstructed output.

Inverted version of the IF reconstructed output 622 may be combined with the intermediate layer input 614 by a difference component 618 to obtain an IF difference output 624. In some implementations, the inverse operation and the combination operation may be effectuated by a given component (e.g., subtraction component 318 of FIG. 3A).

IF difference output 624 may be encoded to obtain intermediate fidelity output bitstream 634. In some implementations, the encoder 606 may be configured using the encoding methodology of HEVC, H.264 and/or another encoding standard.

When encoding content, the size of the viewport window for individual layers (e.g., intermediate and/or higher fidelity) may be configured independently from one another. Higher fidelity image portions may be selected to correspond to areas where a human eye may focus to (e.g., objects of interest within an image); areas distant from the area of focus may be encoded using progressively lower-fidelity. Output of the encoder 606 may be decoded to obtain an $IF_{DIFF}$ reconstructed output 634. The lower fidelity layer's reconstructed and up-sampled output 622 may be combined with the intermediate layer's differential reconstructed output 634 to obtain an intermediate fidelity reconstructed output 636. The combiner 638 may be configured to implement an addition operation to combine 634 and 622. Reconstructed output 636 of intermediate fidelity layer may be up-sampled. The up-sampling component 620 may be configured in accordance with the configuration of the down-sampling component 602 (e.g., the up-sampling factor of 620 may match the down-sampling factor of 602). The resolution of the up-sampled output 642 may match the resolution of the HF layer (e.g., input 302 in some implementations).

An inverted version of the up-sampled IF reconstructed output 644 may be combined with the higher fidelity input by component 628 to obtain HF difference output 642. In some implementations, the inverse operation and the combination operation 628 may be effectuated by a given component (e.g., subtraction component 318 of FIG. 3A). Output 642 may be encoded to obtain high fidelity encoded bitstream component 630.

In some implementations, component 632 may represent a lower resolution image version characterizing low frequency features within the image; component 634 may represent a residual image version that characterizes higher frequency features within the image compared to the component 632; component 630 may represent higher resolution image version characterizing higher frequency features within the image compared to the component 634. In some variants, the lower fidelity component 632 may characterize the whole panoramic input image 302 extent (e.g., spherical image), whereas the higher fidelity components 634, 630 may only characterize portions of the panoramic input (viewport). In some implementations, the position and/or dimensions of the viewport for the HF layer may be configured different from the position and/or extent of the IF layer. In still other implementations, the IF layer output 634 may be configured to represent the entire extent of the panoramic image, whereas the HF layer output 630 only characterizes a portion of the panoramic input (viewport). In yet other implementations, each of the HF layer output 630, IF layer output 634, and LF layer output 632, are configured to represent the entire extent of the panoramic image. Still other variations of the foregoing layered representation of the panoramic image are readily appreciated by artisans of ordinary skill in the related arts, given the contents of the present disclosure.

In some implementations, the reconstructed HF output may be stored (cached) for encoding one or more subsequent images. By way of an illustration, the output of encoder 316 may be decoded to obtain $HF_{DIFF\_RECONSTRUCTED}$ output 642. The output 642 may be combined with the IF output 644 to obtain the $HF_{REC}$ output 650. The output 650 may be cached and used for temporal prediction when encoding one or more subsequent images. The combiner 648 may be configured to implement an addition operation to combine 644 and 642.

The output bitstream 640, including outputs 630, 634, 632, may be provided to a target destination (e.g., stored on a storage medium and/or streamed to a user interface device, e.g., 120 in FIG. 1 and/or 202 in FIG. 2). One or more components 630, 632, 634 may be decoded and combined to obtain a viewport image.

In some implementations of multilayer scalable encoding (e.g., configuration 600 of FIG. 6), the encoding quality may be adapted for a given layer. By way of an illustration, the intermediate layer output 634 may be obtained by configuring encoder 606 to encode output at a lower quality compared to encoder 316; LF output 632 may be obtained by configuring encoder 306 to encode output at a lower quality compared to encoder 606 e.g., by using quality scalability methodologies described with respect to FIGS. 4A-4B. In some implementations, the encoding may be performed using a combination of quality scalability, resolution scalability, and/or spatio-quality scalability. In one or more implementations, resolution modification (e.g., down-sampling/up-sampling operations 602, 604, 610, 620 in FIG. 6) may be added/omitted to effectuate quality scalability encoding.

In some implementations of panoramic content encoding, the spatial extent of the encoded bitstream may be modified in accordance with a bitstream quality parameter and/or resolution parameter. By way of an illustration of encoding spherical (360-degree) content, an LF layer may be configured to encode the whole spherical extent of the image; the HF layer may be configured to encode a viewport of the spherical image (e.g., the portion that the user is viewing on a screen of a smartphone, the predicted view areas, and/or a foveal area); the IF layer may be configured to encode half of spherical extent of the image (e.g., the front hemisphere where the viewport may be located). As the user moves the viewport location (e.g., moves eyes left/right/up/down), the IF bitstream (and LF bitstream) may provide prediction information for the HF bitstream to display an updated viewport. If a user rapidly changes viewport location from the front hemisphere to back hemisphere (e.g., by rotating their head), the LF bitstream may still enable timely display of the viewport image (at a lower resolution and/or quality) until the IF bitstream has buffered the display back hemisphere. It will be recognized by those skilled in the arts that more layers may be used and various other spatial layer configurations may be utilized given resource constraints and/or requirements of a given application (e.g., maximum latency, bandwidth, resolution, frame rate, available computing power, memory, energy, and/or other parameters).

Figure 7A:
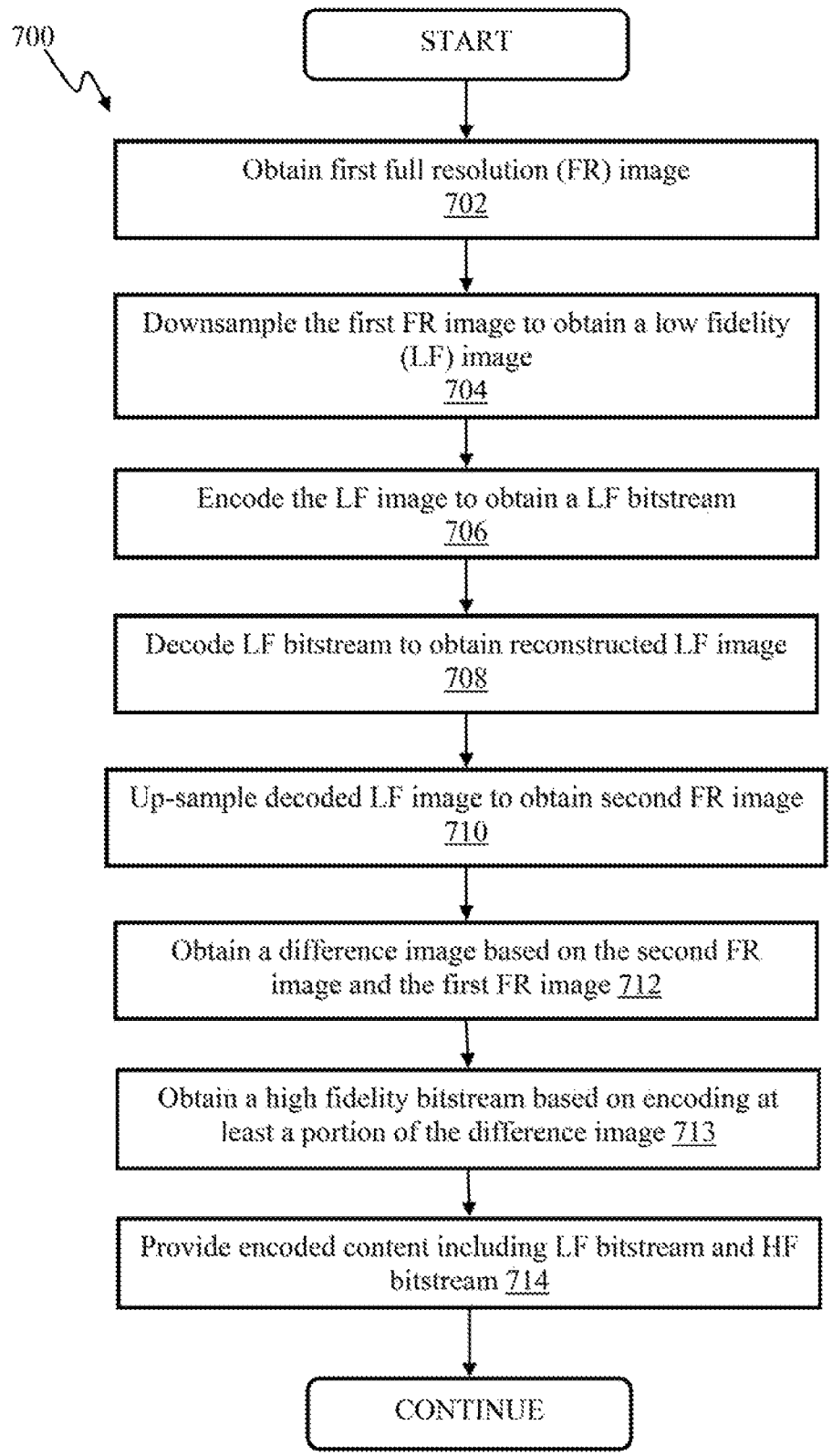
FIG. 7A is logical flow diagram illustrating a method of producing bitstreams for viewing panoramic content in accordance with one implementation of the present disclosure.
Figure 7B:
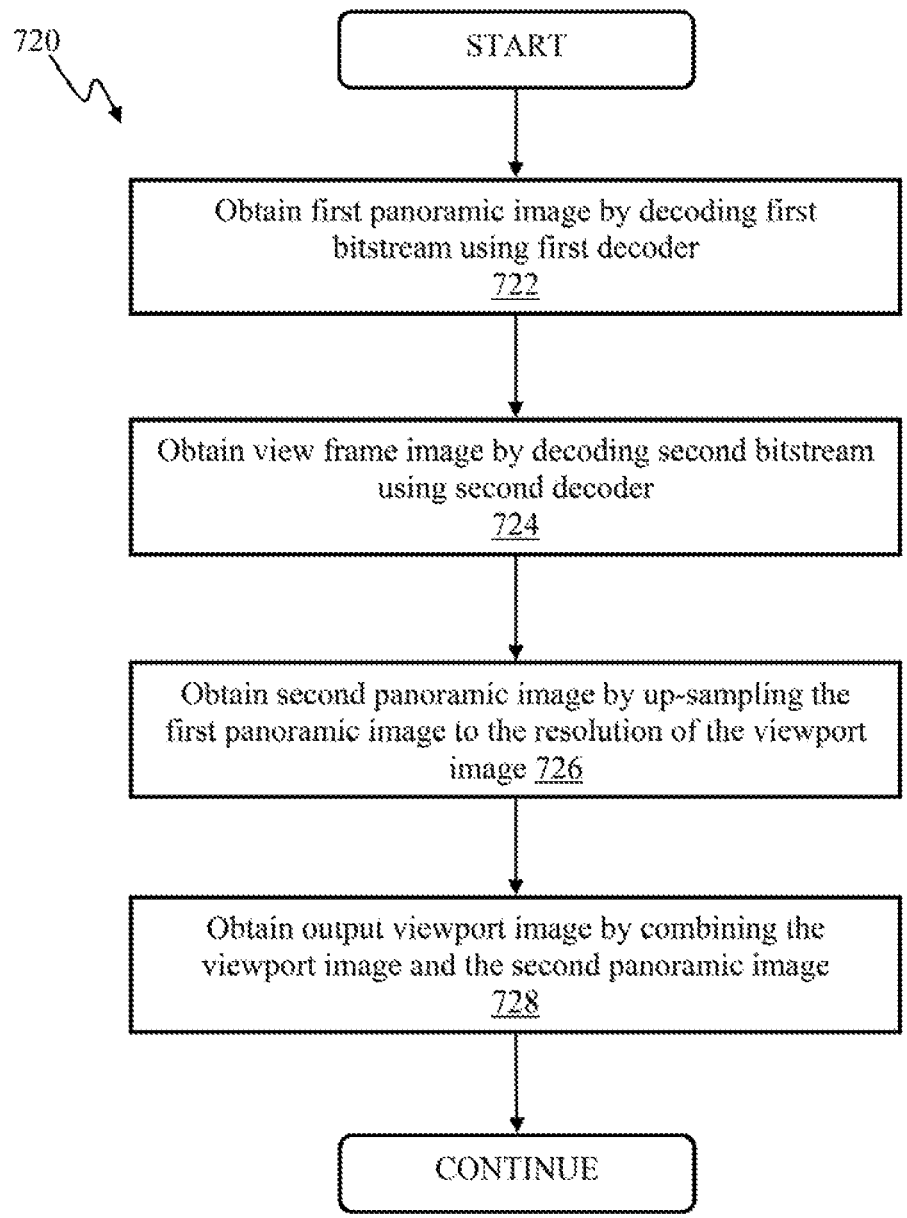
FIG. 7B is logical flow diagram illustrating a method of obtaining an image for a viewport of panoramic content in accordance with one implementation of the present disclosure.
Figure 8:
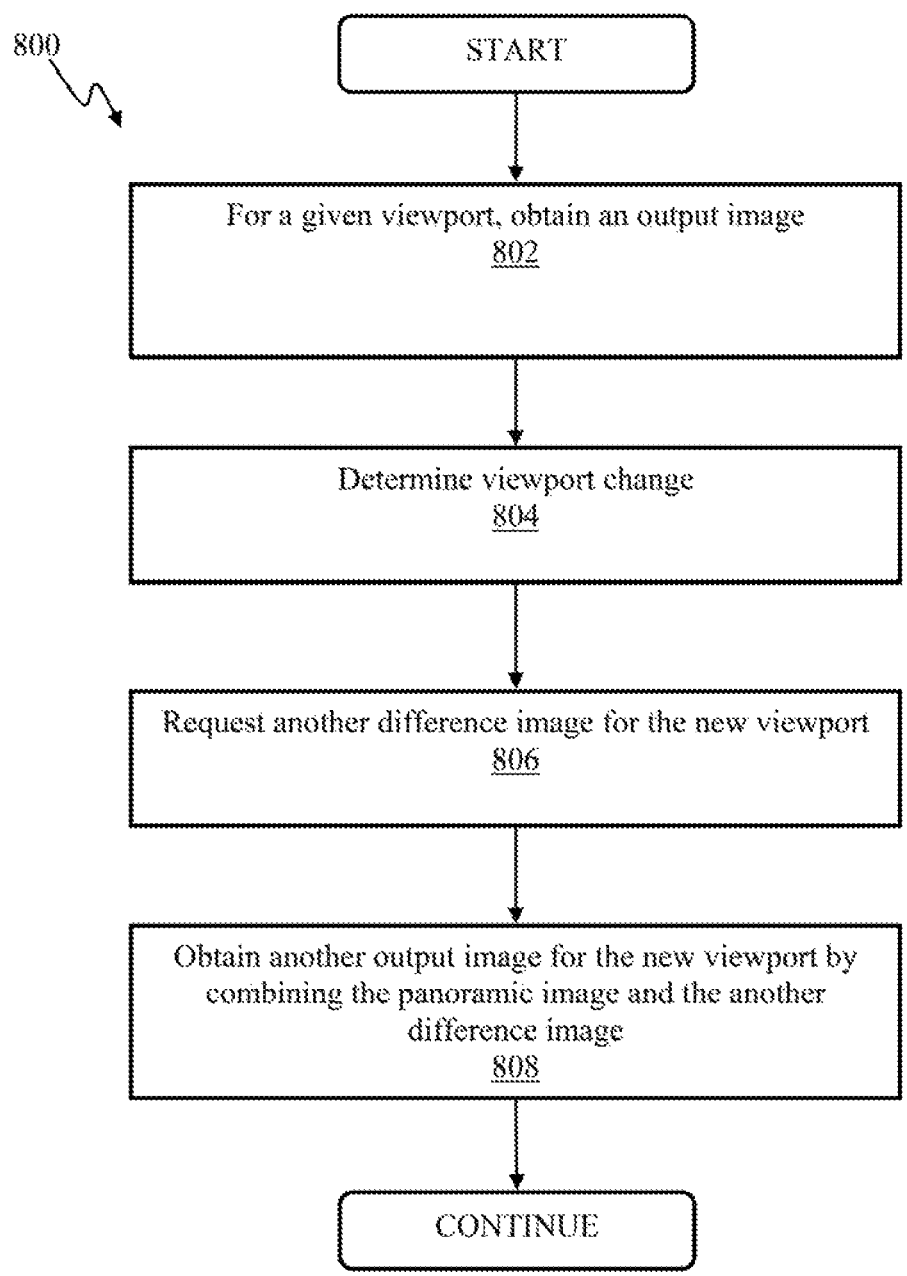
FIG. 8 is logical flow diagram illustrating a method of obtaining an image responsive to a change of a viewport into panoramic content in accordance with one implementation of the present disclosure.

FIGS. 7A-8 illustrate methods 700, 720, 740, 800 for providing panoramic content in accordance with some implementations of the present disclosure. The operations of methods 700, 720, 740, 800 presented below are intended to be illustrative. In some implementations, methods 700, 720, 740, 800 may be accomplished with one or more additional operations not described, and/or without one or more of the operations discussed. Additionally, the order in which the operations of methods 700, 720, 740, 800 are illustrated in FIGS. 7A-8 and described below is not intended to be limiting.

In some implementations, methods 700, 720, 740, 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 720, 740, 800 in response to instructions stored electronically on an electronic storage medium. The one or more processing devices may include one or more devices configured through hardware, firmware, and/or software to be specifically designed for execution of one or more of the operations of methods 700, 720, 740, 800. Operations of methods 700, 720, 740, 800 may be effectuated by one or more devices and/or computerized systems including these described with respect to FIGS. 1A-1B and/or FIG. 9.

FIG. 7A illustrates a method of producing bitstreams for viewing panoramic content in accordance with one implementation of the present disclosure. Artisans of ordinary skill will readily appreciate that the various aspects of the disclosed methods may be implemented by any of the exemplary apparatuses, including without limitation e.g., the devices 110, and 130 of FIGS. 1A-1B, the systems 300, 340, 360, 370, 380, 390 of FIGS. 3A-3F, the systems 400, 450 of FIGS. 4A-4B, the system 600 of FIG. 6, the system 900, 940 of FIGS. 9A-9B, and/or the systems 1000, 1020, 1040 of FIGS. 10A-10C.

At operation 702 of method 700, the first full resolution (FR) image FR1 is obtained. In some implementations, the first full resolution image may correspond to one or more panoramic images. Individual panoramic full resolution full frame images may be obtained by stitching two or more source images obtained with a panoramic capture device, e.g., the device 110 of FIG. 1A. Panoramic full resolution images may be represented using, e.g., rectilinear, planar equirectangular, cubic, icosahedron, octahedron, and/or other projections such as the equirectangular image shown by frame 210 in FIG. 2. In some implementations, an input full resolution image may correspond to a wide angle image obtained with a wide angle lens (e.g., 120-degree to 190-degree field of view). In some virtual reality implementations e.g., such as described with respect to FIGS. 3C-3F, the FR image may correspond to an image of a pair of stereo images (e.g., one for each eye/camera).

An FR image may be provided by a processor (e.g., 132 in FIG. 1B) in operable communication with one or more imaging sensors. In some implementations, the FR image may include an 8K image and be characterized by resolution of 7680 by 4320 pixels, 7680 by 2160 pixels, and/or other resolution in excess of, e.g., full high definition (HD) resolution of 1920 by 1080 pixels.

At operation 704 of method 700, the first FR image is down-sampled to obtain a low fidelity (LF) image. In some implementations, the down-sampling operation may be effectuated by the component 304 of FIG. 3A, and/or the base layer component 908 of FIG. 9A. Image down-sampling factor may be selected between two (2) and sixteen (16), e.g., four (4) in some implementations. By way of an illustration, for a 7680 by 4320 pixel FR image, the down-sampled image LF may be characterized by a full HD resolution of 1920 by 1080 pixels.

At operation 706, LF image is encoded using LF encoder to obtain encoded LF bitstream. The down-sampled LF image (e.g., 324 in FIG. 3A) may be encoded to obtain a low fidelity (LF) output bitstream (e.g., 326 in FIG. 3A). Encoding operation 706 may be effectuated by component 306 of FIG. 3A. The LF image encoding process may use any applicable encoder e.g., block based encoders e.g., H.264, HEVC, V9, wavelet based encoders (e.g., JPEG 2000), lossless encoders and/or any practical image encoder. In some implementations, the encoding operation may be bypassed (i.e., the encoding is skipped, and there is no compression of the LF image). The encoding operation 706 may be optimized for characteristics of the input (LF image). By way of an illustration, given that the input into the encoder corresponds to a down-sampled image, the input may contain fewer high frequency features. As a result, the encoder may make biased decisions to optimize quality for this down-sampled image and/or use these assumptions to speed up encoding. During encoding, the encoder may be configured to save encoding results (e.g., such as motion vector and transformation) for use in the encoding stage.

In some implementations, the term "fidelity" may be used to characterize image quality. Image quality may be characterized by one or more of: an encoded bitstream resolution, a bit-depth, a bitrate, or a combination thereof, and/or other parameters. Encoding operation 706 may be tailored to encode lower fidelity input more efficiently compared to encoding of FR image version. The lower fidelity input may include a softened version of the FR image, reduced bit-depth version of the FR input, or the unaltered FR input. The encoder operation 706 may include a typical H.264, HEVC, and/or VP9 encoder functionality with IPPPP group of pictures (GOP) structure. B-frames in GOP may be used to increase compression performance. Output of the encoding operation 706 may typically be characterized by at a lower bitrate compared to the bitrate of the FR image input.

At operation 708, the encoded LF bitstream is decoded to obtain a reconstructed LF image. The decoding process may be configured to match and/or complement the operation of encoding operation 706 using any applicable methodology, e.g., block based decoders like H.264, HEVC, V9, wavelet based decoders like JPEG 2000, and/or no decoding (if 324 is not being encoded).

At operation 710, the decoded LF image is up-sampled to obtain a second FR image. The up-sampling operation 710 may be configured to reciprocate the down-sampling operation 704. By way of an illustration, for a 7680 by 4320 pixels FR image, the down-sampled LF image may be characterized by a full HD resolution of 1920 by 1080 pixels; the reciprocated up-sampled LF image may be characterized by 7680 by 4320 pixels resolution (which matches the first FR image).

At operation 712, a difference (residual) image is obtained based on the second FR image and the first FR image. In some implementations, the difference image may be obtained by subtracting values of pixels of the up-sampled decoded image (second FR image) from pixels of the first FR image. For multi-channel images (e.g., RGB, YUV), the subtraction operation may be effectuated for each individual channel of the multiple channels.

At operation 713, a high fidelity (HF) bitstream is obtained based on encoding at least a portion of the difference image. The input into the encoding operation 713 may contain less energy at lower frequencies (features with large spatial scales within the image) and more energy at higher frequencies (features with small spatial scales within the image) compared to the FR input image.

In some implementations, subtraction and encoding operations may be effectuated by a high fidelity encoder component. For example consider the systems of FIGS. 10A-10C, where subtraction 318 and encoding operations are effectuated by the high fidelity encoder component e.g., encoder 1010 of the system 1000 of FIG. 10A (or a portion thereof, e.g., the portion generating the HF output 1004), HF encoder 1026 of the system 1020 of FIG. 10B, HF encoder 1046 of the system 1040 of FIG. 10C.

In some implementations, the up-sampling operation 710 and subtraction operation 712 may be effectuated by a HF layer encoder. For example, consider the encoder 1010 of system 1000 of FIG. 10A (or a portion thereof, e.g., the portion generating the HF output 1004), HF encoder 1026 of the system 1020 of FIG. 10B, and/or HF encoder 1046 of the system 1040 of FIG. 10C. In such variants, the input to encoder may include the high resolution input 302 and decoded reconstructed content 328.

In some implementations, the down-sampling operations (e.g., 704) may be effectuated by a LF encoder. For example, the encoder 1010 of the system 1000 of FIG. 10A (or a portion thereof, e.g., the portion generating the LF output 1006), LF encoder 1024 of the system 1020 of FIG. 10B, LF encoder 1044 of the system 1040 of FIG. 10C In some implementations, the operations of method 700 may be effectuated using an encoder component, such as the e.g., encoder 1010 of FIG. 10A. The encoder 1010 may receive the high resolution input and output two (2) bit-streams 1006, 1004 in FIG. 10A, corresponding to a low-fidelity (LF) image and high fidelity (HF) image, respectively.

The HF encoding operation 713 may be configured to encode a higher fidelity input more efficiently compared to a LF encoding operation 706. The HF encoding may be configured to utilize some of the encoding results of operation 706 in order to optimize video quality and/or the speed of encoding. A high fidelity encoder may use a GOP structure consisting of I-frames and P-frames (e.g., IPPPP) to reduce latency that may be associated with processing of B-frames. Alternatively, in scenarios where latency is not at issue, B-frames may be used with success. The HF encoder may be configured such that temporal prediction (from previous reference frames) is not allowed, so as to reduce and/or altogether remove latency when the viewport changes. Since the HF encoder may be encoding higher resolution content compared to the content being encoded by the encoder of operation 706, HF encoding may be operable to utilize larger block sizes, larger transform sizes (e.g., 2-4 times the standard transform size), and/or more advanced encoding tools tailored for high resolution image. By way of an illustration, in image and/or video encoding applications, the discrete cosine transform (DCT) and/or discrete sine transform (DST) are frequently used to encode image residuals (e.g., input image minus a predicted image). These transforms are configured to convert an image signal from a spatial domain into a frequency domain. Transform coefficients in some frequency bands (e.g., lower frequency bands) may be quantized more aggressively compared to other frequency bands (with minimal or no loss of perceptible fidelity in low frequency bands). Aggressive quantization is made possible due to the fact that human eyes are more sensitive to low frequency signals and a majority of natural images/video contain a large percentage of their total energy (e.g., ~90%) in LF bands. Table 1 presents one exemplary scaling matrix for an inter-frame 4×4 (Inter4×4) encoding configuration and an inter-frame 8×8 (Inter8×8) encoding configuration. As shown in the scaling matrices of Table 1, the quantizing coefficients are arranged in a zig-zag pattern with the lowest frequency coefficient in the left top corner and the highest frequency coefficient in the right/bottom corner. The configuration of Table 1 may be used with DCT transforms characterized by signed 16-bit coefficients (with values ranging from −32768 to 32767). Low frequency coefficients of a DCT transform may have absolute values that are greater than the values of the high frequency coefficients. For example, in Table 1 a zigzag pattern is followed to map these numbers to different frequency bands, where the numbers increase from top left to bottom right (more quantization is done for HF bands).

In some implementations, a 4×4 transform may be applied to LF images because of their lower resolution. At high resolution, a 4×4 transform, an 8×8 transform, and/or other transform sizes may be used. In order to achieve better compression performances compared to a 4×4 transform, a 4×4 transform may be combined with an 8×8 in the LF band. Scaling matrices may be modified for a given application configuration (e.g., given combination of bitrate, image quality, computational load, energy used, latency, and/or other image encoding/decoding parameters.)

TABLE 1

$$Q_4 = \begin{bmatrix} 10 & 14 & 20 & 24 \\ 14 & 20 & 24 & 27 \\ 20 & 24 & 27 & 30 \\ 24 & 27 & 30 & 34 \end{bmatrix}$$

Inter4×4

$$Q_8 = \begin{bmatrix} 9 & 13 & 15 & 17 & 19 & 21 & 22 & 24 \\ 13 & 13 & 17 & 19 & 21 & 22 & 24 & 25 \\ 15 & 17 & 19 & 21 & 22 & 24 & 25 & 27 \\ 17 & 19 & 21 & 22 & 24 & 25 & 27 & 28 \\ 19 & 21 & 22 & 24 & 25 & 27 & 28 & 30 \\ 21 & 22 & 24 & 25 & 27 & 28 & 30 & 32 \\ 22 & 24 & 25 & 27 & 28 & 30 & 32 & 33 \\ 24 & 25 & 27 & 28 & 30 & 32 & 33 & 35 \end{bmatrix}$$

Inter8×8

In some implementations, the LF encoder codec may be configured differently from the codec employed by the HF encoder. By way of a non-limiting illustration, the LF encoder may be configured based on a H.264 codec, while the HF encoder may be configured based on a HEVC codec.

In one or more implementations, lower resolution content portion (e.g., LF bitstream) may be encoded using more computationally intensive configuration (e.g., more detailed motion prediction). The output (e.g., motion vectors) of the LF encoding process may be reused and/or refined by the HF encoder in order to reduce energy use associated with obtaining HF bitstream of a given quality and/or obtain higher quality HF bitstream for given energy.

In some implementations, LF and HF bitstreams may be encoded using individually configured profiles of an encoder e.g., the LF bitstream may be encoded using a H.264 baseline profile; the HF bitstream may be encoded using a higher profile of a number of profiles (e.g., the high profile or high10 profile of H.264). Such implementations, may advantageously enable at least partial decoding of the encoded output bitstreams (e.g., 330, 332 in FIG. 3A) by a decoder that may only support lower quality decoder profiles (e.g., a decoder capable of decoding a baseline profile may decode the LF bitstream thereby providing some representation of the content). A decoder capable of decoding a baseline and high profile may provide higher fidelity content by decoding of the LF and the HF bitstreams, compared to a decoder capable of decoding only a single bitstream (LF or HF).

In one or more implementations, the encoding operation 713 may be configured to encode a portion of the residual image obtained at operation 712. By way of an illustration, consider a user that is viewing panoramic content using a small display device (e.g., 120 in FIG. 1A and/or VR headset); the user may view a portion of the panoramic video (e.g., viewport 212 of FIG. 2 and/or 542 of FIG. 5B). The encoding operation 713 may be configured to encode a portion of the residual HF image corresponding to position and/or dimension of the viewport.

At operation 714, the encoded content is provided (for storage, transmission, or other delivery mechanism). In some implementations, the content provision may include provision of the encoded LF bitstream, and provision of a portion of the difference image encoded using a HF encoder (e.g., 316 in FIG. 3A). In one or more implementations, content provision may include provision of the encoded LF bitstream, and provision of the difference image encoded using a HF encoder (e.g., 316 in FIG. 3A).

FIG. 7B illustrates a method of obtaining a viewport into a panoramic content in accordance with one implementation of the present disclosure. Operations of method 720 may be performed by a variety of devices, e.g., remote device 120 of FIG. 1A, VR headset 202 in FIG. 2, a client device 922 of FIG. 9A, or system 940 of FIG. 9B, and/or other device configured to execute instructions and/or supporting decoding functionality using either hardware or software components.

At operation 722 of method 720, a first panoramic image is obtained by decoding a first bitstream using a first decoder. In some implementations, the first bitstream may include a lower fidelity bitstream, e.g., such as bitstream 332 described with respect to FIG. 3A; the first panoramic image may correspond to a base layer (lower fidelity) image such as image 324 of FIG. 3A, 348 of FIG. 3B. The first decoder of the decoding operation 722 may correspond to the LF decoder component 338 of FIG. 3B.

At operation 724, a viewport image is obtained by decoding a second bitstream using a second decoder. In some implementations, the second bitstream may include a higher fidelity bitstream e.g., such as bitstream 330 described with respect to FIG. 3A. In one such variant, the viewport image may correspond to an enhancement layer (higher fidelity) image, such as a difference image 322 of FIG. 3A, 348 of FIG. 3B. The second decoder of the decoding operation 722 may correspond to the HF decoder component 336 of FIG. 3B. The viewport may correspond to viewport 212 of FIG. 2 and/or 542 of FIG. 5B.

At operation 726, a second panoramic image is obtained by up-sampling the first panoramic image to the resolution of the viewport image. In some implementations, the up-sampling operation may be effectuated by component 344 of decoder 340; the up-sampling factor may be configured in accordance with a down-sampling factor utilized when obtaining the LF bitstream.

At operation 728, the final output view frame image is obtained by combining the view frame image and the second panoramic image. In some implementations, the output may correspond to an array of pixels used to display a viewport into a panoramic image (e.g., the viewport 542 of FIG. 5B). The combination may include determination of the position and/or extent of the viewport within the second panoramic image. For example, in one such variant, the dimensions 544, 546 of the viewport is determined. In one such variant, the position of the viewport is determined based on the location of the e.g., the left lower corner (such as is demonstrated at 545, 547 in FIG. 5B). The output may be displayed on a display device (e.g., 120 in FIG. 1A) and/or stored for subsequent viewing.

While the aforementioned discussion of FIG. 7B is described with respect to applications for obtaining a viewport into a panoramic content, artisans of ordinary skill in the related arts will readily appreciate that the foregoing discussion may be readily modified for providing content for rendering a viewport of panoramic content, given the contents of the present disclosure. For example, a first high fidelity (HF) image may be obtained, and a low fidelity (LF) image can be generated therefrom. A second HF image may be generated based on the first HF image and the LF image. The resulting difference image between the first and second HF image along with the LF image can be provided in an encoded format for rendering. In some variants, only a portion of the difference image corresponding to a viewport is provided.

FIG. 8 is logical flow diagram illustrating a method 800 of obtaining an image responsive to a change of a viewport within the panoramic content in accordance with one implementation of the present disclosure. Operations of method 800 may be implemented by e.g., system 900 of FIG. 9A.

At operation 802 of the method 800, for a given viewport, an output image is obtained. In some implementations, the given viewport may correspond to an area within panoramic image extent e.g., the area 212 within image 210 in FIG. 2 and/or area 542 within panoramic image 540 in FIG. 5B. The output image may be obtained by combining a lower fidelity panoramic image version and a difference image for the viewport area e.g., such as described with respect to FIG. 7A and/or FIG. 3B. The output image may be displayed by a user interface device (e.g., 120 of FIG. 1A).

At operation 804, a viewport change is determined. In some implementations, the viewport change may be based on a change in the viewport orientation and/or position. By way of an illustration, a viewport change may be due to a user panning the display device 120 along a trajectory 128. In other implementations, the viewport change may be based on a change in the viewport dimension(s). Viewport changes may be determined based on a transmission of viewport location, orientation, and/or dimension by a user interface device (e.g., 120 in FIG. 1A and/or 920 in FIG. 9A) to a content provision entity (e.g., capture device 110 in FIG. 1A and/or processing apparatus 902 of FIG. 9A).

At operation 806, another difference image for the new viewport may be requested. The another difference image may correspond to image 346 of FIG. 3B and/or output of operation 712 of method 700. The new viewport may correspond to viewport location, orientation and/or dimension (e.g., viewport 222 in FIG. 2). By way of an illustration of VR content viewing, the output image of operation 802 may correspond to viewport 212 of FIG. 2; viewport change may occur due to user head movement from configuration 200 to configuration 220; the another difference image may correspond to HF image corresponding to viewport 222 in FIG. 2.

At operation 808, another output image for the new viewport is obtained. The output image may be obtained by combining the panoramic image version (e.g., such as used at operation 802) and the another difference image for the new viewport obtained at operation 806. The another output image may be displayed by a user interface device (e.g., 120 of FIG. 1A and/or 202 in FIG. 2).

FIG. 9A illustrates a computerized system for encoding content using the scalable encoding methodology of the disclosure. In some implementations, the system 900 of FIG. 9A may be configured to encode content during content acquisition by a capture device. In one or more implementations, the system 900 may be configured to encode previously acquired content.

The system 900 of FIG. 9A may include a processing apparatus 902 (e.g., including capture device 110 of FIG. 1A, 130 of FIG. 1B, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration.

The apparatus 902 may be in operable communication with one or more remote client devices 922, 924 via one or more electronic communications interface 920. The interface 920 may include one or more wired interfaces (e.g., serial, USB, Thunderbolt™, HDMI, Ethernet, and/or other wired interfaces) and/or wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the interface 920 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface 920 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 900 may use custom and/or dedicated data communications technologies instead of, or in addition to, the ones described above.

The remote device 922, 924 may include a user interface device, one or more of a portable communications device (e.g., smartphone, a digital camera, a laptop, a tablet computer, a desktop computer, a television set-top box, smart TV, a gaming console, a client computing platform, and/or other platforms), a capture device (e.g., a camera), and/or other device configured to communicate information with the apparatus 902. In some implementations, the system 900 may include multiple capture devices 902, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, the foregoing being incorporated herein by reference in its entirety.

The apparatus 902 may include one or more physical processors 904 configured by machine-readable instructions 906 and/or other components. Executing the machine-readable instructions 906 may cause the one or more physical processors 904 to effectuate encoding of content using methodology of the disclosure. The machine-readable instructions 906 may include one or more of content component, a base layer component 908, enhancement layer component 910, viewport determination component 912, a distribution component 914, and/or other components.

One or more features and/or functions of the apparatus 902 may be facilitation of video content acquisition, encoding and/or provision of content. It is noted that although the present disclosure is directed to videos and/or video clips, one or more other implementations of system 900 and/or apparatus 902 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The apparatus 902 may include electronic storage 918. The apparatus 902 may include communication lines or ports to enable the exchange of information with a network and/or other entities. Illustration of apparatus 902 in FIG. 9A is not intended to be limiting. The apparatus 902 may include a plurality of hardware, software, and/or firmware components operating together to provide the functionality attributed herein to apparatus 902. For example, the apparatus 902 may be implemented by a cloud of computing platforms operating together as apparatus 902.

Electronic storage 918 may comprise electronic storage media that electronically stores information. The electronic storage media of electronic storage 918 may include one or both of system storage that is provided integrally (i.e., substantially non-removable) with apparatus 902 and/or removable storage that is removably connectable to apparatus 902 via, for example, a port or a drive. A port may include a USB port, a Firewire port, and/or other port. A drive may include a disk drive and/or other drive. Electronic storage 918 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 918 may include one or more virtual storage resources (e.g., cloud storage, a virtual private network, and/or other virtual storage resources). The electronic storage 918 may be configured to store software algorithms, information determined by processor(s) 904, information received from apparatus 902, information received from external resource(s), and/or other information that enables apparatus 902 to function as described herein.

The system 900 may include an external resource(s) operatively linked via one or more electronic communication links 920. External resource(s) may include sources of information, hosts, and/or other entities outside of system 900, external entities participating with system 900, computing platforms, and/or other resources. In some implementations, some or all of the functionality attributed herein to external resources may be provided by resources included in system 900.

It will be appreciated that this is not intended to be limiting and that the scope of this disclosure includes implementations in which apparatus 902, client devices (e.g., 922, 924), external resources, and/or other entities may be operatively linked via some other communication media.

Processor(s) 904 may be configured to provide information-processing capabilities in apparatus 902. As such, processor 904 may include one or more of a digital processor, an analog processor, a digital circuit designed to process information, an analog circuit designed to process information, a state machine, and/or other mechanisms for electronically processing information. Although processor 904 is shown in FIG. 9A as a single entity, this is for illustrative purposes only. In some implementations, processor 904 may include one or more processing units. These processing units may be physically located within the same device, or processor 904 may represent processing functionality of a plurality of devices operating in coordination. The processor 904 may be configured to execute components 907, 908, 910, 912, and/or 914. Processor 904 may be configured to execute components 907, 908, 910, 912, and/or 914 by software; hardware; firmware; some combination of software, hardware, and/or firmware; and/or other mechanisms for configuring processing capabilities on processor 904.

It should be appreciated that although components 907, 908, 910, 912, and/or 914 are illustrated in FIG. 9A as being co-located within a single processing unit, in implementations in which processor 904 includes multiple processing units, one or more of components 907, 908, 910, 912, and/or 914 may be located remotely from the other components. The description of the functionality provided by the different 907, 908, 910, 912, and/or 914 described above is for illustrative purposes and is not intended to be limiting, as any of components 907, 908, 910, 912, and/or 914 may provide more or less functionality than is described. For example, one or more of components 907, 908, 910, 912, and/or 914 may be eliminated, and some or all of its functionality may be provided by other ones of components 907, 908, 910, 912, and/or 914 and/or other components. As an example, processor 904 may be configured to execute one or more additional components that may perform some or all of the functionality attributed below to one of components 907, 908, 910, 912, and/or 914.

In FIG. 9A, the content component may be configured to access and/or encode image and/or audio content. In some implementations, the component 907 may be configured to effectuate image/audio content acquisition using any applicable methodologies including those described herein. By way of an illustration, the component 907 may be operable to instantiate content acquisition by the capture device 110 based on a timer event, user instruction, or a sensor event. In one or more implementations, the component 907 may be operable effectuate content acquisition by a VR headset, e.g., such as shown in FIG. 2. In some implementations, the component 907 may be operable to access previously acquired content from electronic storage 918 and/or external resource (e.g., external storage, and/or remote user device during content upload). The operations performed by the content component 907 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on 22 Oct. 2015, incorporated supra, and/or in a session container (e.g., such as described in detail in U.S. patent application Ser. No. 15/001,038, entitled "STORAGE OF METADATA AND IMAGES" filed on 19 Jan. 2016, the foregoing being incorporated herein by reference in its entirety).

In FIG. 9A the base layer image component 908 may be configured to effectuate obtaining of a lower fidelity bitstream (e.g., 332, 333 of FIGS. 3A-3D and/or 432 of FIG. 4A) using the encoder configuration shown and described herein. In some implementations, the base layer component 908 may be configured to implement resolution scalability encoding, e.g., such as described with respect to FIG. 3A, and/or FIG. 3C-3D. In one or more implementations, the base layer component 908 may be configured to implement quality scalability encoding, e.g., such as described with respect to FIG. 4A. Various other encoding implementations are contemplated including, e.g., a multilayer scalability encoding, combinations of resolution scalability and quality scalability, and/or other scalability encoding implementations.

In FIG. 9A, enhancement layer component 910, may be configured to effectuate obtaining of a higher fidelity bitstream (e.g., 330 of FIGS. 3A-3D and/or 430 of FIG. 4A) using the encoder configuration shown and described herein. In some implementations, the enhancement layer component 910 may be configured to obtain a HF bitstream using resolution scalability encoding, e.g., such as described with respect to FIG. 3A, and/or FIG. 3C-3D. In one or more implementations, the enhancement layer component 910 may be configured to implement quality scalability encoding, e.g., such as described with respect to FIG. 4A. Various other encoding implementations are contemplated, including e.g., a multilayer scalability encoding, combinations of resolution scalability and quality scalability, and/or other scalability encoding implementations. The enhancement layer bitstream may characterize a portion (viewport) of the extent of the panoramic image (e.g., viewport 542 in FIG. 5B). The viewport configuration may be provided by the viewport determination component 912. In some implementations, the enhancement layer component may be configured to obtain two or more bitstreams (e.g., for left/right channels of stereo imaging content; and/or intermediate and enhancement layer bitstreams 630, 634 of FIG. 6).

In FIG. 9A, viewport determination component 912 may be configured to determine viewport configuration. In some implementations, the viewport (e.g., 212 in FIG. 2, and/or 542 in FIG. 5B) may be obtained based on coordinates of two diagonally opposing corners of a rectangle provided by. e.g., client device 922. In one or more implementations, the viewport configuration may include a viewport orientation that may be obtained based on orientation sensor output (e.g., gyro) of the client device 922. The playback device may send absolute coordinates of the rectangle that is being displayed (pixels values corresponding to top-left and bottom-right points). This may be performed at per frame interval). In some implementations, the viewport may be updated based on viewport changes. In some implementations, gyroscopic information (in real time) may be sent from the playback device.

In FIG. 9A, a distribution component 914, may be configured to provide content to a given destination. The content may include the base layer bitstream and one or more enhancement layers. The content provision may include storing the content on the storage component 918 for viewing; broadcasting content, and/or otherwise delivering content to one or more client devices (e.g., the remote device 922, 924 (e.g., smartphone) and/or external resource (e.g., cloud storage)), and/or other operations.

FIG. 9B illustrates a computerized system for decoding content using scalable architecture of the disclosure, in accordance with one implementation.

In some implementations, the functionality of FIG. 9B may be implemented by a user interface device, e.g., smartphone, smart TV, set top box, tablet computer, game console, a system on a chip, and/or other computerized device.

The system 940 of FIG. 9B may include an apparatus 942 (e.g., including capture device 110 of FIG. 1A, user interface device (e.g., 120 of FIG. 1B), a client device (e.g., 920 of FIG. 9A), a computing device in communications with a capture device and/or content depository, a cloud computing apparatus, and/or other apparatus) configured to decode audio and/or imaging content, e.g., video and/or photos. Content depository may include a network attached storage (NAS), a portable storage (e.g., flash memory), a cloud storage, a server, a personal computer, a DVR, and/or other storage configuration. The apparatus 942 may include a user interface device, one or more of a portable communications device (e.g., smartphone, a digital camera, a laptop, a tablet computer, a desktop computer, a television set-top box, smart TV, a gaming console, a VR headset, a client computing platform, and/or other platforms), a capture device (e.g., a camera), and/or other device configured to communicate information with the apparatus 942. In some implementations, the system 940 may include multiple capture devices, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, the foregoing being incorporated herein by reference in its entirety.

The apparatus 942 may be in operable communication with a processing apparatus (e.g., 902 of FIG. 9A) and one or more external resources 960 via one or more electronic communications interface 920.

The apparatus 942 may include one or more physical processors 944 configured by machine-readable instructions 946 and/or other components. Executing the machine-readable instructions 946 may cause the one or more physical processors 944 to effectuate encoding of content using methodology of the disclosure. The machine-readable instructions 946 may include one or more of: a viewport component 948, a base layer decoding component 950, an enhancement layer decoding component (abbreviated in FIG. 9B as EL decoding component) 952, a viewport image reconstruction component 954, a server communications component 956, and/or other components.

One or more features and/or functions of the apparatus 942 may include the capability of decoding video content. It is noted that although the present disclosure is directed to videos and/or video clips, one or more other implementations of system 940 and/or apparatus 942 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The apparatus 942 may include electronic storage 958. The apparatus 942 may include communication lines or ports to enable the exchange of information with a network and/or other entities. Illustration of apparatus 942 in FIG. 9B is not intended to be limiting. The apparatus 942 may include a plurality of hardware, software, and/or firmware components operating together to provide the functionality attributed herein to apparatus 942. For example, the apparatus 942 may be implemented by a cloud of computing platforms operating together as apparatus 942.

Electronic storage 958 may comprise electronic storage media that electronically stores information. The electronic storage media of electronic storage 958 may include one or both of system storage that is provided integrally (i.e., substantially non-removable) with apparatus 942 and/or removable storage that is removably connectable to apparatus 942 via, for example, a port or a drive. A port may include a USB port, a Firewire port, and/or other port. A drive may include a disk drive and/or other drive. Electronic storage 918 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 918 may include one or more virtual storage resources (e.g., cloud storage, a virtual private network, and/or other virtual storage resources). The electronic storage 918 may be configured to store software algorithms, information determined by processor(s) 944, information received from apparatus 942, information received from external resource(s), and/or other information that enables apparatus 942 to function as described herein.

The system 940 may include an external resource(s) 960 operatively linked via one or more electronic communication links 920. External resource(s) may include sources of information, hosts, and/or other entities outside of system 940, external entities participating with system 940, computing platforms, and/or other resources. In some implementations, some or all of the functionality attributed herein to external resources may be provided by resources included in system 940. By way of an illustration, external resource 960 may correspond to a media center, configured to decode imaging content including LF and HF bitstreams and communicate decoded image content to a display device (e.g., smartphone and/or VR headset).

It will be appreciated that this is not intended to be limiting and that the scope of this disclosure includes implementations in which apparatus 942, processing apparatus 902, external resources 960, and/or other entities may be operatively linked via some other communication media.

Processor(s) 944 may be configured to provide information-processing capabilities in apparatus 942. As such, processor 944 may include one or more of a digital processor, an analog processor, a digital circuit designed to process information, an analog circuit designed to process information, a state machine, and/or other mechanisms for electronically processing information. Although processor 944 is shown in FIG. 9B as a single entity, this is for illustrative purposes only. In some implementations, processor 944 may include one or more processing units. These processing units may be physically located within the same device, or processor 944 may represent processing functionality of a plurality of devices operating in coordination. The processor 944 may be configured to execute components 946, 948, 950, 952, 954, and/or 956. Processor 944 may be configured to execute components 946, 948, 950, 952, 954, and/or 956 by software; hardware; firmware; some combination of software, hardware, and/or firmware; and/or other mechanisms for configuring processing capabilities on processor 944.

It should be appreciated that although components 946, 948, 950, 952, 954, and/or 956 are illustrated in FIG. 9B as being co-located within a single processing unit, in implementations in which processor 944 includes multiple processing units, one or more of components 946, 948, 950, 952, 954, and/or 956 may be located remotely from the other components. The description of the functionality provided by the different 946, 948, 950, 952, 954, and/or 956 described above is for illustrative purposes and is not intended to be limiting, as any of components 946, 948, 950, 952, 954, and/or 956 may provide more or less functionality than is described. For example, one or more of components 946, 948, 950, 952, 954, and/or 956 may be eliminated, and some or all of its functionality may be provided by other ones of components 946, 948, 950, 952, 954, and/or 956 and/or other components. As an example, processor 944 may be configured to execute one or more additional components that may perform some or all of the functionality attributed below to one of components 946, 948, 950, 952, 954, and/or 956.

In FIG. 9B, viewport component 948 may be configured to determine a viewport configuration for displaying content on a display device (client device). In some implementations, the viewport (e.g., 212 in FIG. 2, and/or 542 in FIG. 5B) position, orientation, and/or dimensions may be obtained based on coordinates of two diagonally opposing corners of a screen of the client device (e.g., 202 in FIG. 2, 120 in FIG. 1A). In one or more implementations, the viewport configuration may include viewport orientation that may be obtained based on orientation sensor output (e.g., gyroscopes) of the content display device. The device may send absolute coordinates of the rectangle that is being displayed (pixels coordinates corresponding to top-left and bottom-right points). This may be performed on a per frame interval). In some implementations, the viewport may be updated based on viewport changes. In some implementations, gyroscopic information (in real time) may be sent from playback device.

In FIG. 9B the base layer decoding component 950 may be configured to decode a lower fidelity bitstream (e.g., 332, 333 of FIGS. 3A-3F and/or 432 of FIGS. 4A-4B) using one or more decoder configurations shown and described herein. In some implementations, the base layer component 950 may be configured to implement resolution scalability decoding e.g., such as described with respect to FIG. 3B and/or FIG. 3E-3F. In one or more implementations, the base layer component 950 may be configured to implement quality scalability decoding e.g., such as described with respect to FIG. 4B. Various other encoding implementations are contemplated including e.g., a multilayer scalability encoding, combinations of resolution scalability and quality scalability, and/or other scalability encoding implementations. Base layer bitstream may characterize extent of the panoramic image (e.g., extent of image 540 in FIG. 5B).

In FIG. 9B, enhancement layer (EL) component 952, may be configured to decode a higher fidelity bitstream (e.g., 330 of FIGS. 3A-3D) using one or more decoder configurations shown and described herein. In some implementations, the enhancement layer component 952 may be configured to decode a HF bitstream using resolution scalability coding e.g., such as described with respect to FIG. 3B, and/or FIG. 3E-3F. In one or more implementations, the enhancement layer component 952 may be configured to implement quality scalability decoding e.g., such as described with respect to FIG. 4B. Various other encoding implementations are contemplated including e.g., a multilayer scalability encoding, combinations of resolution scalability and quality scalability, and/or other scalability encoding implementations. The enhancement layer bitstream may characterize a portion (viewport) of the extent of the panoramic image (e.g., viewport 542 in FIG. 5B). The viewport configuration may be provided by the viewport component 948. In some implementations, the enhancement layer component may be configured to decode two or more bitstreams (e.g., for left/right channels of stereo imaging content; and/or intermediate and enhancement layer bitstreams such as 630, 634 of FIG. 6).

In FIG. 9B, a viewport image reconstruction component 954, may be configured to obtain an image for a viewport. Component 954 may be configured to determine portion of the base layer image corresponding to a viewport, perform pixel-wise addition of pixels of the portion of the base layer image and pixels of the enhanced layer image, perform interpolation, and/or other operations. The viewport image may be provided to a target destination, e.g., including storing the image on a storage component 958 for viewing; displaying on a display, communicating to a display device, and/or otherwise delivering content to one or more client devices (e.g., the remote device 922, 924 (e.g., smartphone) and/or external resource (e.g., cloud storage)), and/or other operations.

FIGS. 10A-10C illustrate exemplary configurations of scalability encoder that may be utilized for providing viewable panoramic content, in accordance with some implementations.

In FIG. 10A, encoder 1010 may be configured to obtain high fidelity (HF) output and low fidelity (LF) based on the input 1002 (e.g., 302 of FIG. 3A) using any applicable methodologies including these described herein.

In FIG. 10B, LF encoder 1024 may be configured to effectuate down-sample operation, e.g., such as described herein; HF 1026 encoder may be configured to effectuate the up-sample and/or the difference image determination (e.g., subtraction) operations, e.g., such as described herein.

In FIG. 10C, HF encoder 1046 may be configured to determine the difference image using any applicable methodologies, including these described herein.

Figure 11:
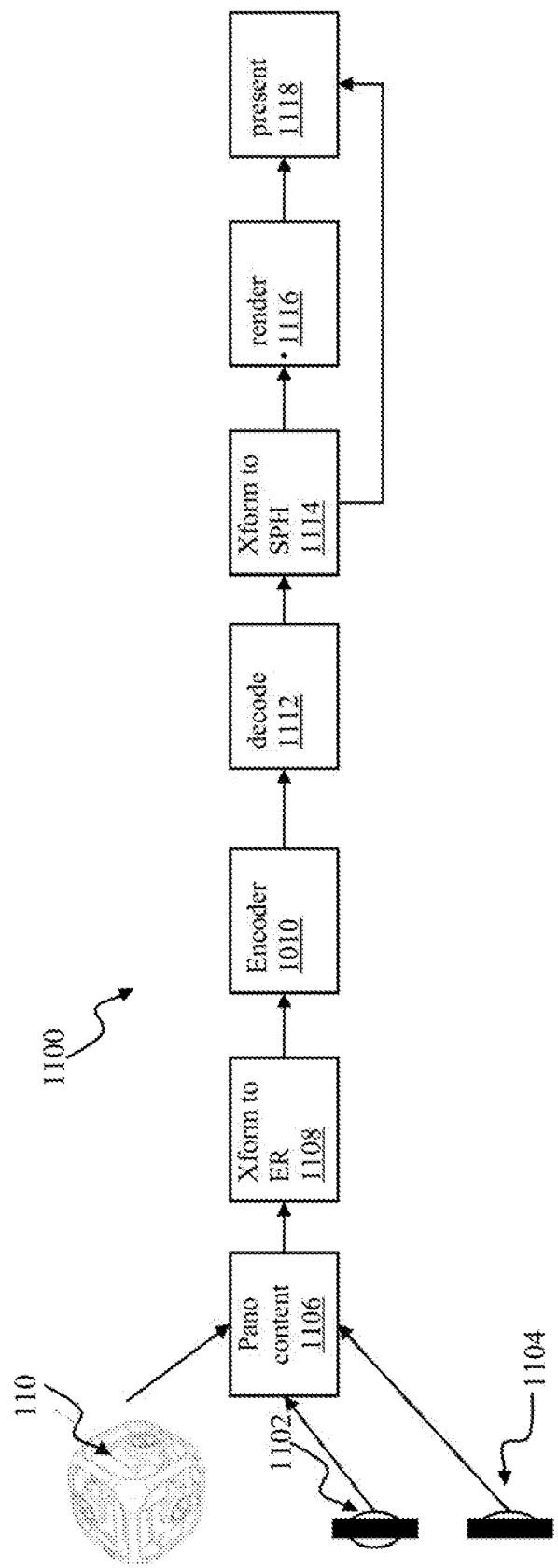
FIG. 11 illustrates a processing pipeline for providing panoramic content using the scalability encoding methodology of the disclosure, in accordance with some implementations.

FIG. 11 illustrates a processing pipeline for providing panoramic content using scalability methodology of the disclosure.

Panoramic content may be obtained using one or more capture devices, e.g., multi-lens capture apparatus 110 of FIG. 1, a unibody spherical camera 1102, e.g., such as shown and described in U.S. patent application Ser. No. 15/057, 896, entitled "UNIBODY DUAL-LENS MOUNT FOR A SPHERICAL CAMERA", filed 1 Mar. 2016, the foregoing being incorporated herein by reference in its entirety; and/or a capture device 1104 with a wide angle lens (i.e., a lens whose focal length is substantially smaller than the focal length of a normal lens for a given film plane). In some implementations, the capture device 1104 may be characterized by lens horizontal angle of view (field of view) that may be greater than 60°. e.g., 120° in one implementation.

One or more capture devices (e.g. 110, 1102, 1104 in FIG. 11) may obtain panoramic content 1106 that may be characterized by spherical field of view and/or spherical distortion. As used herein, the term spherical field of view may be used to refer to content that may be obtained with capture device characterized by a lens curvature that is substantially different than a planar (rectilinear) lens. Panoramic content may be transformed into equirectangular (ER) content using transformation operation 1108. The transformation operation may in some implementations include fish eye to ER transformation. Equirectangular content (e.g., equirectangular images) may be encoded using scalable encoding methodology of the disclosure. Content encoded by the encoder 1010 may be provided to a target destination (e.g., user device 120 of FIG. 1A, VR device 202 of FIG. 2). Encoded content may be decoded. Decoder 1112 may be configured using any applicable methodologies, e.g., such as described with respect to FIG. 3B and/or FIG. 4B). Decoded content may be transferred to spherical representation. In some implementations, transformation 1114 may be configured to transform a portion of the field of view associated with a view port (e.g., 542) using a transformation that may be reciprocal (e.g., inverse) to the transformation operation 1108. The transformed content may be rendered by a render operation 1116. Rendering operation 1118 may be configured based on hardware and/or software capabilities of the client device (e.g., 120 in FIG. 1A). In some implementations, rendering operations may include obtaining bitmap texture, procedural textures, lights/shadows, bump mapping and relative position to other objects. Rendered content may be presented. In some implementations, presentation 1218 may include projection of content on a display device, e.g., VR headset. In some implementations wherein presentation may be effectuated by a 2D display, rendering operation may be bypassed.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", "transmission channel", "delay line", "wireless" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

It is further recognized that the various aspects of the present disclosure may be implemented, with proper adaptation by one of ordinary skill given the present disclosure, using either so-called "lossy" or "lossless" encoder paradigms.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A method of obtaining an image responsive to a change of a viewport, the method comprising:
    obtaining a difference image based at least on a first full-resolution image and a second full-resolution image;
    encoding a portion of the difference image to produce an encoded portion, the encoded portion corresponding to a position of the viewport; and
    providing, via a communications interface to a client device, at least the encoded portion corresponding to the position of the viewport.

2. The method of claim 1, further comprising:
    obtaining the first full-resolution image from a sequence of images, the first full-resolution having a first frame resolution;
    downsampling the first full-resolution image to obtain a downsampled image having a second frame resolution, the second frame resolution being lower than the first frame resolution; and
    encoding the downsampled image into a reduced-fidelity bitstream.

3. The method of claim 2, further comprising selecting an image resolution of the second frame resolution of the downsampled image based at least on a scaling factor ranging from two (2) to sixteen (16), inclusive.

4. The method of claim 2, further comprising:
decoding the reduced-fidelity bitstream into a reduced-fidelity image; and
upsampling the reduced-fidelity image to obtain the second full-resolution image;
wherein the encoding of the portion of the difference image comprises generating an increased-fidelity bitstream; and
wherein the providing the at least encoded portion of the difference image comprises providing at least the increased-fidelity bitstream to the client device.

5. The method of claim 3, wherein the providing the at least encoded portion of the difference image comprises providing the reduced-fidelity bitstream to the client device along with the increased-fidelity bitstream.

6. The method of claim 1, wherein the obtaining of the difference image comprises subtracting values of pixels of the second full-resolution image from pixels of the first full-resolution image for each of one or more image components.

7. The method of claim 1, further comprising modifying a bitrate for the at least encoded portion of the difference image based on a scalability parameter.

8. A non-transitory computer-readable apparatus comprising a storage medium, the storage medium including a computer program comprising a plurality of instructions which are configured to, when executed by one or more processor apparatus, cause a computerized apparatus to:
obtain a residual image based on a first full-resolution image and a second full-resolution image;
detect a portion of the obtained residual image, the portion being viewed by a user;
encode the portion of the obtained residual image;
produce a high-fidelity bitstream based at least on the encode of the portion of the obtained residual image; and
provide at least the produced high-fidelity bitstream to a client device of the user.

9. The non-transitory computer-readable apparatus of claim 8, wherein the plurality of instructions are further configured to, when executed by the one or more processor apparatus, cause the computerized apparatus to:
downsample the first full-resolution image to obtain a downsampled image having a resolution lower than that of the first full-resolution image; and
encode the downsampled image into a low-fidelity bitstream;
wherein a number of bits per pixel of the high-fidelity bitstream is greater than that of the low-fidelity bitstream.

10. The non-transitory computer-readable apparatus of claim 9, wherein the plurality of instructions are further configured to, when executed by the one or more processor apparatus, cause the computerized apparatus to:
determine the frame resolution of the downsampled image based at least on a downsampling factor selected from a range of two (2) and sixteen (16), inclusive.

11. The non-transitory computer-readable apparatus of claim 8, wherein the plurality of instructions are further configured to, when executed by the one or more processor apparatus, cause the computerized apparatus to:
decode the low-fidelity bitstream into a low-fidelity image; and
upsample the low-fidelity image to obtain the second full-resolution image.

12. The non-transitory computer-readable apparatus of claim 11, wherein the upsample of the low-fidelity image comprises a reciprocation of a downsampling factor, the downsampling factor being selected from a range of two (2) and sixteen (16), inclusive.

13. The non-transitory computer-readable apparatus of claim 8, wherein the residual image is obtained based on a subtraction of values of pixels of the second full-resolution image from pixels of the first full-resolution image for each of one or more image components.

14. The non-transitory computer-readable apparatus of claim 8, wherein the plurality of instructions are further configured to, when executed by the one or more processor apparatus, cause the computerized apparatus to:
obtain a plurality of source images from one or more capture devices; and
combine the plurality of source images to obtain the first full-resolution image.

15. A computerized apparatus for providing video content, the computerized apparatus comprising:
a processing apparatus;
a network interface in data communication with the processing apparatus;
a non-transitory computer-readable apparatus comprising a storage medium, the storage medium including a computer program comprising a plurality of instructions which are configured to, when executed by the processing apparatus, cause a computerized apparatus to:
derive a difference image based at least on a first image and a second image;
encode a portion of the derived difference image to generate an encoded portion, the encoded portion corresponding to a position of a viewport as reflected in data received from at least one client device via the network interface; and
provide, to the network interface for distribution to the at least one client device, at least the encoded portion of the difference image corresponding to the position of the viewport.

16. The computerized apparatus of claim 15, wherein the plurality of instructions are further configured to, when executed by the processing apparatus, cause the computerized apparatus to:
downsample the first image to obtain a downsampled image having a second frame resolution, the second frame resolution being lower than a first frame resolution of the first image; and
encode the downsampled image into a first bitstream.

17. The computerized apparatus of claim 16, wherein the plurality of instructions are further configured to, when executed by the processing apparatus, cause the computerized apparatus to:
decode the first bitstream into a reduced-fidelity image; and
upsample the reduced-fidelity image to obtain the second image;
wherein the encode of the portion of the difference image comprises generation of a second bitstream; and
wherein the provision the at least encoded portion of the difference image comprises provision of at least the high-fidelity bitstream to the at least one client device.

18. The computerized apparatus of claim 17, wherein the provision the at least encoded portion of the difference image comprises provision of the first bitstream along with the second bitstream to the at least one client device.

19. The computerized apparatus of claim 15, further comprising a storage device;
wherein the plurality of instructions are further configured to, when executed by the processing apparatus, cause the computerized apparatus to:
cause storage of the at least encoded portion of the difference image on at least one of (i) the storage device of the computerized apparatus or (ii) a networked remote storage device.

20. The computerized apparatus of claim 15, wherein the plurality of instructions are further configured to, when executed by the processing apparatus, cause the computerized apparatus to:
obtain the first image based on one or more source images acquired from one or more capture devices.

* * * * *